US012615373B2

(12) United States Patent
Huang et al.

(10) Patent No.: US 12,615,373 B2
(45) Date of Patent: Apr. 28, 2026

(54) DECODER-SIDE CONTROL POINT MOTION VECTOR REFINEMENT FOR AFFINE INTER-PREDICTION IN VIDEO CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US); Yan Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 95 days.

(21) Appl. No.: 18/476,931

(22) Filed: Sep. 28, 2023

(65) Prior Publication Data

US 2024/0121399 A1    Apr. 11, 2024

Related U.S. Application Data

(60) Provisional application No. 63/487,101, filed on Feb. 27, 2023, provisional application No. 63/379,045, (Continued)

(51) Int. Cl.
*H04N 19/139* (2014.01)
*H04N 19/176* (2014.01)
*H04N 19/517* (2014.01)

(52) U.S. Cl.
CPC ......... *H04N 19/139* (2014.11); *H04N 19/176* (2014.11); *H04N 19/517* (2014.11)

(58) Field of Classification Search
CPC .. H04N 19/139; H04N 19/176; H04N 19/517; H04N 19/52; H04N 19/54; H04N 19/44
See application file for complete search history.

(56) References Cited

U.S. PATENT DOCUMENTS

| | | |
|---|---|---|
| 2018/0270500 A1 | 9/2018 | Li et al. |
| 2020/0404253 A1* | 12/2020 | Chen ...................... B23P 15/00 |

(Continued)

FOREIGN PATENT DOCUMENTS

| | | |
|---|---|---|
| WO | 2023020588 A1 | 2/2023 |

OTHER PUBLICATIONS (Alibaba Group) Chen J., et al., "Non-EE2: DMVR for Affine Merge Coded Blocks", JVET-AA0144-v2, Joint Video Experts Team (JVET) of ITU-T SG 16 WP 3 and ISO/IEC JTC 1/SC 29, 27th Meeting, by teleconference, Jul. 13-22, 2022, Teleconference, The Joint Video Exploration Team of ISO/IEC JTC1/SC29/WG11 and ITU-T SG.16 ), m60120, Jul. 18, 2022, XP030303030.

(Continued)

*Primary Examiner* — Richard T Torrente
(74) *Attorney, Agent, or Firm* — Shumaker & Sieffert, P.A.

(57) ABSTRACT

An example device for decoding video data includes a memory configured to store video data; and a processing system comprising one or more processors implemented in circuitry, the processing system being configured to: refine a first control point motion vector (CPMV) of a current block of the video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block. In some examples, the CPMVs may each be decoded using a respective merge index and a respective motion vector difference (MVD).

40 Claims, 11 Drawing Sheets

Related U.S. Application Data filed on Oct. 11, 2022, provisional application No. 63/377,800, filed on Sep. 30, 2022.

(56) References Cited

U.S. PATENT DOCUMENTS

| | | | |
|---|---|---|---|
| 2022/0070443 A1 | 3/2022 | Chen et al. | |
| 2022/0256187 A1* | 8/2022 | Lee | H04N 19/56 |
| 2023/0388529 A1* | 11/2023 | Gao | H04N 19/523 |
| 2024/0073440 A1* | 2/2024 | Xiu | H04N 19/1887 |

OTHER PUBLICATIONS

Blestel M., et al., "EE2-2.1: On Affine DMVR", Joint Video Experts Team (JVET) of ITU-T SG 16 WP 3 and ISO/IEC JTC 1/SC 29, JVET-AD0182-v2, 30th Meeting, Antalya, TR, Apr. 21-28, 2023, pp. 1-10.

Chen J., et al., "Decoder-Side Affine Model Refinement for Video Coding Beyond VVC", 2023 Data Compression Conference (DCC), Mar. 21-24, 2023, pp. 248-257.

Chen J., et al., "EE2-2.6: DMVR for Affine Merge Coded Blocks", Joint Video Experts Team (JVET) of ITU-T SG 16 WP 3 and ISO/IEC JTC 1/SC 29, JVET-AB0112-v1, 28th Meeting, Mainz, DE, Oct. 20-28, 2022, pp. 1-3.

Chen J., et al., "EE2-2.6-related: On Decoder-side Affine Model Refinement (DAMR)", Joint Video Experts Team (JVET) of ITU-T SG 16 WP 3 and ISO/IEC JTC 1/SC 29, JVET-AB0145-v2, 28th Meeting, Mainz, DE, Oct. 20-28, 2022, pp. 1-4.

Fu T., et al., "Affine Direct/Skip Mode with Motion Vector Differences in Video Coding", IEEE International Conference on Multimedia Expo Workshops (ICMEW), Jul. 6-10, 2020, 6 pages.

Huang H., et al., "EE2 Test 2.1, 2.2, 2.3, 2.4: Affine DMVR", JVET-AC0144-v1, Joint Video Experts Team (JVET) of ITU-T SG 16 WP 3 and ISO/IEC JTC 1/SC 29, 29th Meeting, by Teleconference, Jan. 11-20, 2023, Jan. 5, 2023, 6 Pages.

Huang H., et al., "EE2-related: Control-point Motion Vector Refinement for Affine DMVR", Joint Video Experts Team (JVET) of ITU-T SG 16 WP 3 and ISO/IEC JTC 1/SC 29, JVET-AB0178-v1, 28th Meeting, Mainz, DE, Oct. 20-28, 2022, pp. 1-3.

Huang (Qualcomm) H., et al., "EE2-related: Sub-block Processing for Affine DMVR", JVET-AB0177-v2, m60965, The Joint Video Exploration Team of ISO/IEC JTC1/SC29/WG11 and ITU-T SG. 16, Joint Video Experts Team (JVET) of ITU-T SG 16 WP 3 and ISO/IEC JTC 1/SC 29, 28th Meeting, Mainz, DE, Oct. 20-28, 2022, pp. 1-3, XP030304760, XP030304762, The Whole Document.

International Search Report and Written Opinion—PCT/US2023/034090—ISA/EPO—Jan. 29, 2024, 15 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Seregin V., et al., "Exploration Experiment on Enhanced Compression Beyond VVC Capability (EE2)", Joint Video Experts Team (JVET) of ITU-T SG 16 WP 3 and ISO/IEC JTC 1/SC 29, JVET-AC2024-v2, 29th Meeting, by teleconference, Jan. 11-20, 2023, pp. 1-30.

Sullivan G.J., et al., "Motion Compensation for Video Compression Using Control Grid Interpolation", ICASSP 91: 1991 International Conference on Acoustics, Speech, and Signal Processing, Apr. 14-17, 1991, XP010043566, pp. 2713-2716.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

* cited by examiner

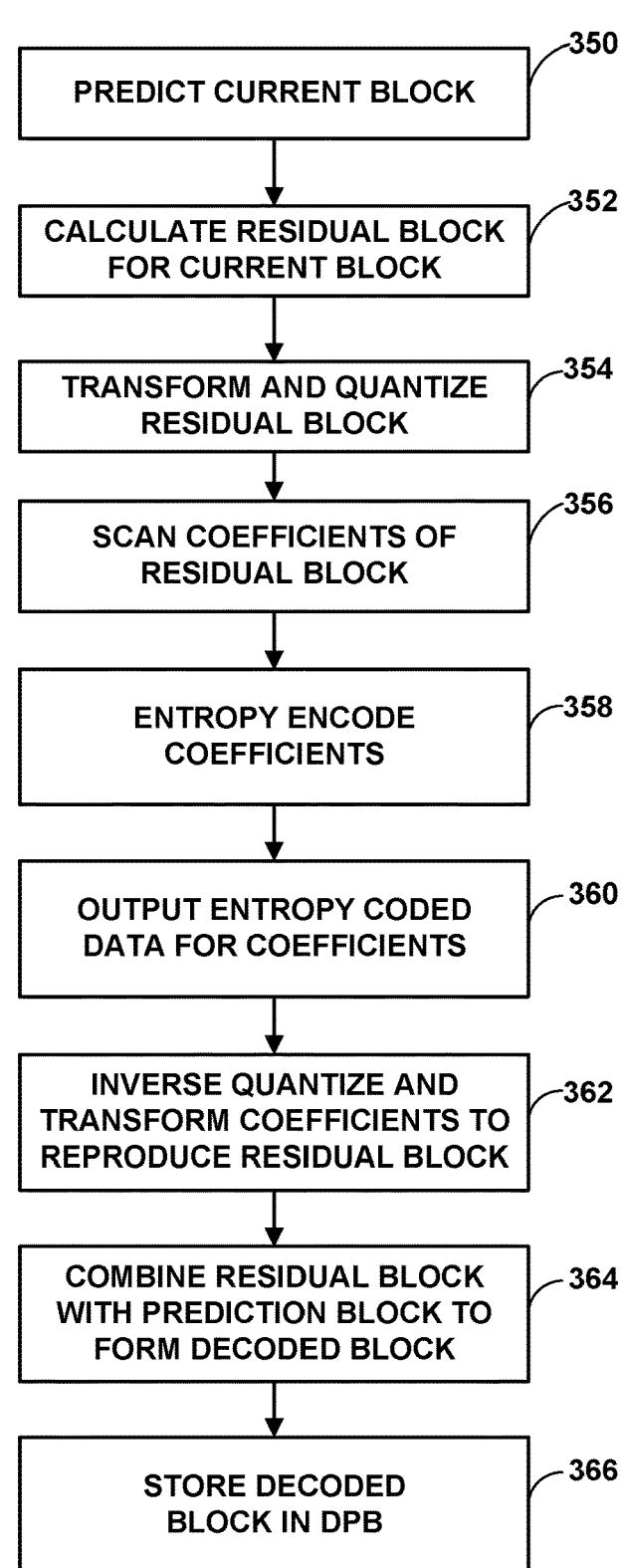

PREDICT CURRENT BLOCK — 350

CALCULATE RESIDUAL BLOCK FOR CURRENT BLOCK — 352

TRANSFORM AND QUANTIZE RESIDUAL BLOCK — 354

SCAN COEFFICIENTS OF RESIDUAL BLOCK — 356

ENTROPY ENCODE COEFFICIENTS — 358

OUTPUT ENTROPY CODED DATA FOR COEFFICIENTS — 360

INVERSE QUANTIZE AND TRANSFORM COEFFICIENTS TO REPRODUCE RESIDUAL BLOCK — 362

COMBINE RESIDUAL BLOCK WITH PREDICTION BLOCK TO FORM DECODED BLOCK — 364

STORE DECODED BLOCK IN DPB — 366

FIG. 8

RECEIVE ENTROPY CODED
DATA FOR CURRENT BLOCK                    370

ENTROPY DECODE DATA TO
DETERMINE PREDICTION AND                  372
REPRODUCE COEFFICIENTS

PREDICT CURRENT BLOCK                     374

INVERSE SCAN REPRODUCED
COEFFICIENTS                              376

INVERSE QUANTIZE AND
INVERSE TRANSFORM
COEFFICIENTS TO PRODUCE                   378
RESIDUAL BLOCK

COMBINE PREDICTED BLOCK
AND RESIDUAL BLOCK                        380

DETERMINE ACTUAL CPMVs — 400

DETERMINE MERGE CANDIDATES FOR CPMVs — 402

REFINE MERGE CANDIDATES ACCORDING TO DMVR — 404

CALCULATE MVDs — 406

ENCODE MERGE CANDIDATES — 408

ENCODE MVDs — 410

GENERATE PREDICTION BLOCK USING ACTUAL CPMVs — 412

DECODE MERGE INDEXES — 420

DETERMINE MERGE CANDIDATES FROM MERGE INDEXES — 422

REFINE MERGE CANDIDATES ACCORDING TO DMVR — 424

DECODE MVDs — 426

APPLY MVDs TO INTERMEDIATE REFINED CPMVs — 428

GENERATE PREDICTION BLOCK USING CPMVs — 430

DECODER-SIDE CONTROL POINT MOTION VECTOR REFINEMENT FOR AFFINE INTER-PREDICTION IN VIDEO CODING

This application claims the benefit of:

U.S. Provisional Application No. 63/377,800, filed Sep. 30, 2022;

U.S. Provisional Application No. 63/379,045, filed Oct. 11, 2022; and

U.S. Provisional Application No. 63/487,101, filed Feb. 27, 2023, the entire contents of each of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for refining control point motion vectors (CPMVs) during a video decoding (e.g., reproduction) process when a block of video data is predicted using affine motion prediction. A block of video data that is predicted using affine motion prediction may be predicted using multiple CPMVs. For example for a four-parameter affine model, two CPMVs may be used, e.g., corresponding to upper-left and upper-right corners of the block. As another example, for a six-parameter affine model, three CPMVs may be used, e.g., corresponding to upper-left, upper-right, and lower-left corners of the block. According to the techniques of this disclosure, each of the CPMVs may be refined using one or more of a variety of decoder-side motion vector refinement (DMVR) techniques, such as bilateral matching or template matching.

As one example, each CPMV may be identified using a respective merge index. In addition, a motion vector difference (MVD) may be coded for each CPMV. A video decoder may perform the DVMR process on an initial CPMV identified by the merge index to form an intermediate refined CPMV, then add the MVD to the intermediate refined CPMV to form a refined CPMV. The video decoder may perform the DMVR processes independently on each CPMV. In this manner, the video decoder may perform the DMVR processes in parallel, which may reduce latency associated with decoding the video data.

In one example, a method of decoding video data includes refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block. Refining the first CPMV may include determining a first predicted CPMV according to a first merge index value; refining the first predicted CPMV using the first DMVR process to form a first intermediate refined CPMV; decoding first motion vector difference (MVD) data; and adding the first MVD data to the first intermediate refined CPMV to form the first refined CPMV. Refining the second CPMV may include determining a second predicted CPMV according to a second merge index value; refining the second predicted CPMV using the second DMVR process to form a second intermediate refined CPMV; decoding second motion vector difference (MVD) data; and adding the second MVD data to the second intermediate refined CPMV to form the second refined CPMV.

In another example, a device for decoding video data includes a memory configured to store video data; and a processing system comprising one or more processors implemented in circuitry, the processing system being configured to: refine a first control point motion vector (CPMV) of a current block of the video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block.

In another example, a computer-readable storage medium has stored thereon instructions that, when executed, cause a processor to refine a first control point motion vector (CPMV) of a current block of video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block.

In another example, a device for decoding video data includes means for refining a first control point motion vector (CPMV) of a current block of video data using a first decoder-side motion vector refinement (DMVR) process to form a first refined CPMV for the current block; means for refining a second CPMV of the current block of video data using a second DMVR process, independently of the first DMVR process, to form a second refined CPMV for the current block; means for forming a prediction block for the current block using the first refined CPMV and the second refined CPMV; and means for decoding the current block using the prediction block.

The details of one or more examples are set forth in the accompanying drawings and the description below. Other features, objects, and advantages will be apparent from the description, drawings, and claims.

BRIEF DESCRIPTION OF DRAWINGS

FIG. 8 is a flowchart illustrating an example method for encoding a current block in accordance with the techniques of this disclosure.

DETAILED DESCRIPTION

In general, this disclosure describes techniques for refining control point motion vectors (CPMVs) during a video decoding (e.g., reproduction) process when a block of video data is predicted using affine motion prediction. A block of video data that is predicted using affine motion prediction may be predicted using multiple CPMVs. For example for a four-parameter affine model, two CPMVs may be used, e.g., corresponding to upper-left and upper-right corners of the block. As another example, for a six-parameter affine model, three CPMVs may be used, e.g., corresponding to upper-left, upper-right, and lower-left corners of the block.

4

According to the techniques of this disclosure, each of the CPMVs may be refined using one or more of a variety of decoder-side motion vector refinement (DMVR) techniques, such as bilateral matching (BM) or template matching. In particular, rather than determining a common offset for all CPMVs, per the techniques of this disclosure, a video coder (encoder or decoder) may determine offsets for each CPMV respectively. In this manner, the refined CPMVs may be used to generate a more accurate prediction block, which in turn may reduce a bitrate of a bitstream, thereby improving performance of the video coder.

Figure 1:
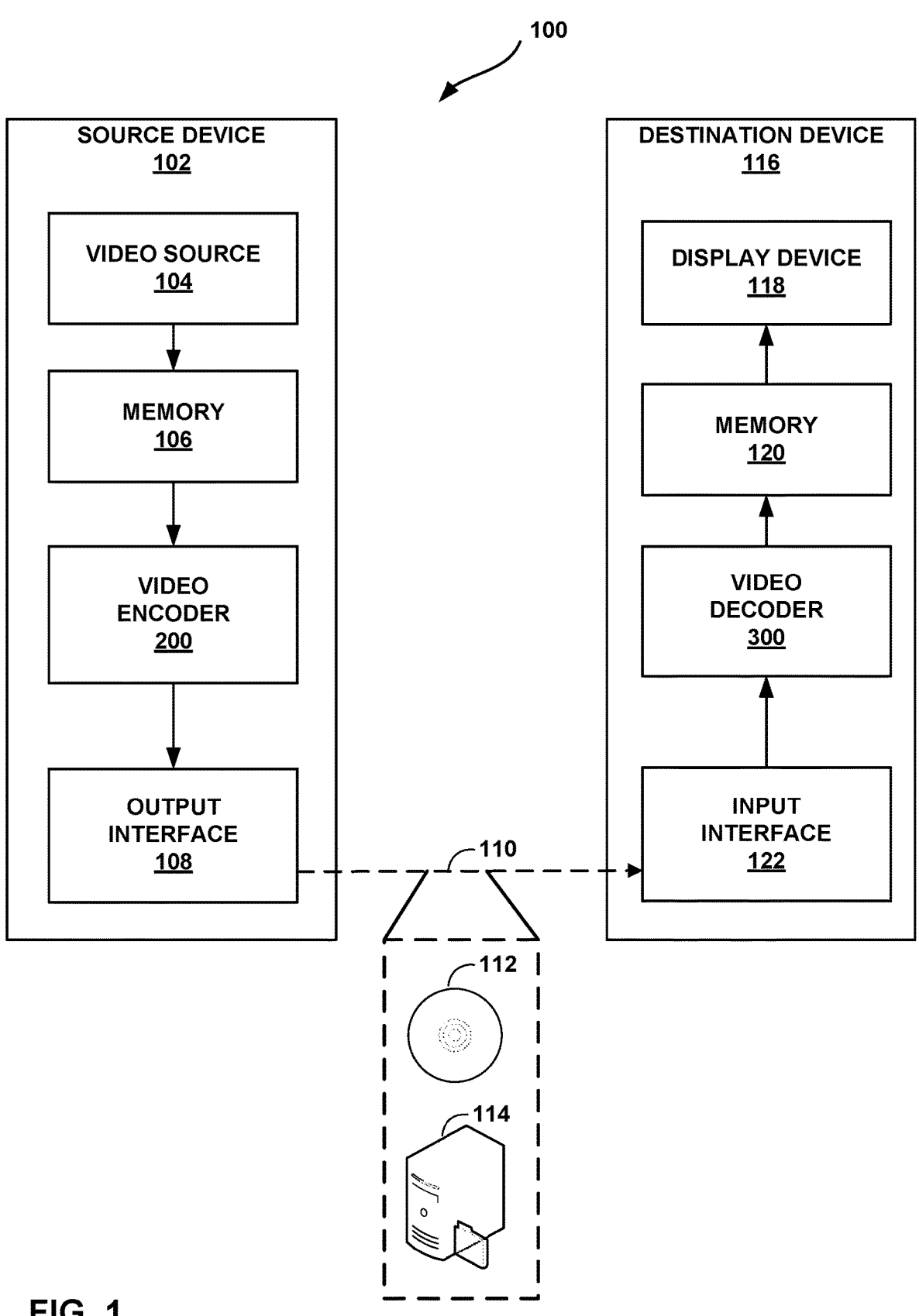
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for refining control point motion vectors. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for refining control point motion vectors. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that refine control point motion vectors.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

According to the techniques of this disclosure, video encoder 200 may determine that a current block of video data is to be predicted using affine motion compensation. Video encoder 200 may determine a number of control point motion vectors (CPMVs) to be used to predict the current block, e.g., two, three, or four CPMVs. Video encoder 200 may further encode data representative of the CPMVs, e.g., a merge index for each of the CPMVs. Moreover, video encoder 200 may use the merge indexes to obtain respective intermediate CPMVs for each of the CPMVs, then refine the intermediate CPMVs using decoder-side motion vector refinement (DMVR) techniques, e.g., as discussed in greater detail below. After refining the intermediate CPMVs, video encoder 200 may calculate a motion vector difference (MVD) value representing a difference between an actual CPMV to be used and the intermediate refined CPMV. The MVD values may include a respective motion magnitude value and a respective direction value. Video encoder 200 may use the actual CPMVs to generate a prediction block for the current block. Video encoder 200 may signal the merge indexes and MVD values in the bitstream.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

According to the techniques of this disclosure, video decoder 300 may determine that a current block is to be predicted using affine motion compensation. Video decoder 300 may receive and decode syntax data indicating a number of control point motion vectors (CPMVs) for the current block. For each of the CPMVs, video decoder 300 may receive a respective merge index and a respective motion vector difference (MVD) value. The MVD value may include a magnitude value and a direction value. Video decoder 300 may determine respective initial CPMVs using the merge indexes, then refine the initial CPMVs using respective, distinct DMVR processes to form respective intermediate refined CPMVs. Video decoder 300 may then apply the respective MVD values to the respective intermediate refined CPMVs to form refined CPMVs. Video decoder 300 may then form a prediction block for the current block using the refined CPMVs.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
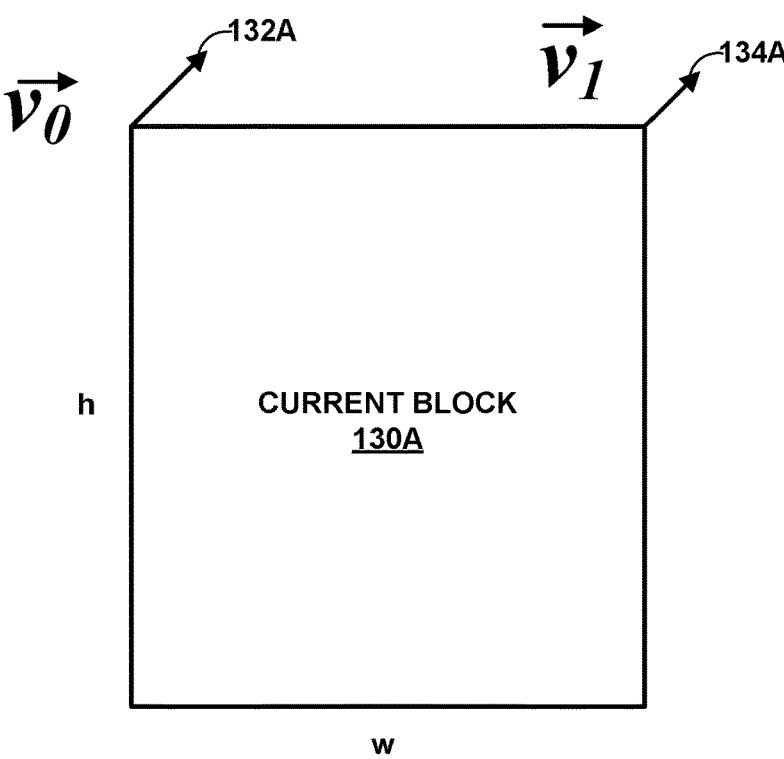
FIGS. 2A and 2B are conceptual diagrams illustrating examples of control point motion vectors for affine motion vector prediction.
Figure 2B:
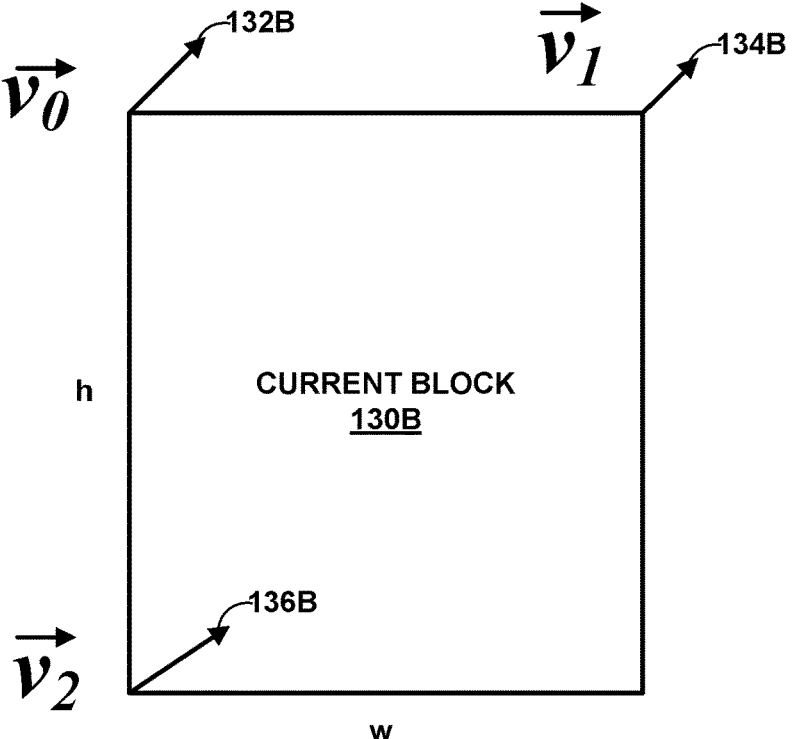

FIGS. 2A and 2B are conceptual diagrams illustrating examples of control point motion vectors for affine motion vector prediction. In particular, FIG. 2A depicts an example of current block 130A that is predicted with two control point motion vectors (CPMVs) 132A, 134A. FIG. 2B depicts an example of current block 130B that is predicted with three CPMVs 132B, 134B, 136B.

An affine motion model can be described as:

$$\begin{cases} v_x = ax + by + e \\ v_y = cx + dy + f \end{cases}$$

In this example, $(v_x, v_y)$ is the motion vector at the coordinate $(x, y)$, and a, b, c, d, e, and f are the six affine parameters. This disclosure refers to this affine motion model as a 6-parameter affine motion model. In a typical video coder (e.g., video encoder 200 or video decoder 300), a picture is partitioned into blocks for block-based coding.

According to the techniques of this disclosure, video encoder 200 and video decoder 300 may independently perform decoder-side motion vector refinement (DMVR) processes on CPMVs 132A and 132B. That is, video encoder 200 and video decoder 300 may each perform a first DMVR process on CPMV 132A, and independently perform a second, different DMVR process on CPMV 132B. While DMVR refers to "decoder-side," video encoder 200 may perform the same refinement process as video decoder 300, such that CPMV data encoded by video encoder 200 accurately matches CPMV data decoded and reconstructed by video decoder 300.

In accordance with techniques of this disclosure, to encode and refine CPMV 132A, video encoder 200 may determine a first merge candidate that closely matches CPMV 132A. Video encoder 200 may then perform a first DMVR process on the first merge candidate to generate a first intermediate refined CPMV. Video encoder 200 may then calculate a first motion vector difference (MVD) value representing differences between CPMV 132A and the intermediate refined CPMV. Video encoder 200 may use CPMV 132A to predict current block 130A, and also encode data representing the merge candidate and the first MVD.

Similarly, according to the techniques of this disclosure, video encoder 200 may determine a second merge candidate that closely matches CPMV 134A. Video encoder 200 may then perform a second DMVR process on the second merge candidate to generate a second intermediate refined CPMV. Video encoder 200 may then calculate a second MVD value representing differences between CPMV 134A and the second intermediate refined CPMV. Video encoder 200 may use CPMV 134A to predict current block 130A, and also encode data representing the second merge candidate and the second MVD.

Video decoder 300 may receive the data representing the first and second merge candidates and the first and second MVDs, along with an encoded version of current block 130. Video decoder 300 may perform the first DMVR process on the first merge to generate the first intermediate refined CPMV from the first merge candidate, then add the first MVD value to the first intermediate refined CPMV to reconstruct CPMV 132A, representing a first refined CPMV in this example. Video decoder 300 may likewise perform the second DMVR process on the second merge candidate to generate the second intermediate refined CPMV from the second merge candidate, then add the second MVD value to the second intermediate refined CPMV to reconstruct CPMV 134A. Video decoder 300 may then use CPMVs 132A and 134A to generate a prediction block and use the prediction block to decode and reconstruct current block 130A.

The affine motion model for a block can also be described by three motion vectors (MVs) $\vec{v}_0=(v_{0x},v_{0y})$, $\vec{v}_1=(v_{1x},v_{1y})$, and $\vec{v}_2=(v_{2x},v_{2y})$ at 3 different locations that are not in the same line, such as CPMVs 132B, 134B, and 136B of FIG. 2B. The 3 locations are usually referred to as control-points, the 3 motion vectors are referred to as control-point motion vectors (CPMVs).

In the case when the 3 control-points are at the 3 corners of the block, as in FIG. 2B, the affine motion can be described as:

$$\begin{cases} v_x = \dfrac{(v_{1x} - v_{0x})}{blkW}x + \dfrac{(v_{2x} - v_{0x})}{blkH}y + v_{0x} \\ v_y = \dfrac{(v_{1y} - v_{0y})}{blkW}x + \dfrac{(v_{2y} - v_{0y})}{blkH}y + v_{0y} \end{cases}$$

wherein blkW and blkH are the width (w in FIGS. 2A and 2B) and height (h in FIGS. 2A and 2B) of the block.

In this example, according to the techniques of this disclosure, video encoder 200 may perform three distinct DVMR processes for each of CPMVs 132B, 134B, and 136B. For each of these CPMVs, video encoder 200 may determine a corresponding merge candidate, then perform the corresponding DMVR process on the merge candidate to generate an intermediate refined CPMV. Video encoder 200 may calculate respective MVDs representing the differences between the original CPMVs 132B, 134B, and 136B and the respective intermediate refined CPMVs.

Likewise, per the techniques of this disclosure, video decoder 300 may receive data representing the merge candidates, MVD values, and the encoded version of current block 130B (e.g., including quantized transform coefficients). Video decoder 300 may perform the respective DMVR processes on the respective merge candidates to generate intermediate refined CPMVs, then add the respective MVD values to the corresponding intermediate refined CPMVs to reconstruct CPMVs 132B, 134B, and 136B. Ultimately video decoder 300 may decode current block 130B, e.g., generate a prediction block using CPMVs 132B, 134B, and 136B, decode the quantized transform coefficients to construct a residual block, then add the residual block to the prediction block on a pixel-by-pixel basis to reconstruct current block 130B.

In affine mode, different motion vectors can be derived for each pixel in the block according to the associated affine motion model. Therefore, motion compensation can be performed pixel-by-pixel (or sample-by-sample). However, to reduce the complexity, subblock-based motion compensation may be performed, wherein the block is partitioned into multiple subblocks (that have smaller block sizes), and each subblock is associated with one motion vector for block-based motion compensation. The motion vector for each subblock may be derived using the representative coordinate of the subblock. Typically, the center position is used. In one example, the block is partitioned into non-overlapping subblocks. The block width is blkW, block height is blkH, the subblock width is sbW and subblock height is sbH, then there are blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column may be derived as:

$$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases}$$

The subblock MVs may be rounded to the predefined precision and stored in the motion buffer for motion compensation and motion vector prediction.

A simplified 4-parameters affine model (for zoom and rotational motion) is described as:

$$\begin{cases} v_x = ax + by + e \\ v_y = cx + dy + f \end{cases}$$

Similarly, the 4-parameters affine model for a block (as in the example of FIG. 2A) can be described by 2 CPMVs $\vec{v}_0 = (v_{0x}, v_{0y})$ and $\vec{v}_1 = (v_{1x}, v_{1y})$ at the 2 corners (typically top-left and top-right) of the block. The motion field is then described as:

$$\begin{cases} v_x = \frac{(v_{1x} - v_{0x})}{blkW}x - \frac{(v_{1y} - v_{0y})}{blkH}y + v_{0x} \\ v_y = \frac{(v_{1y} - v_{0y})}{blkW}x + \frac{(v_{1x} - v_{0x})}{blkW}y + v_{0y} \end{cases}$$

The subblock MV at $i_{th}$ row and $j_{th}$ column may be derived as:

$$\begin{cases} v_x = \frac{(v_{1x} - v_{0x})}{blkW}\left(j*sbW + \frac{sbW}{2}\right) + \frac{(v_{1y} - v_{0y})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{1x} - v_{0x})}{blkH}\left(i*sbH + \frac{sbH}{2}\right) + v_{0y} \end{cases}$$

After the sub-block based affine motion compensation is performed, the prediction signal can be refined by adding an offset, which may be derived based on the pixel-wise motion and the gradient of the prediction signal. The offset at location (m, n) can be calculated as:

$$\Delta I(m,n) = g_x(m,n)*\Delta v_x(m,n) + g_y(m,n)*\Delta v_y(m,n)$$

In this example, $g_x(m, n)$ is the horizontal gradient and $g_y(m, n)$ is the vertical gradient of the prediction signal, respectively. $\Delta v_x(m, n)$ and $\Delta v_y(m, n)$ are the differences in x and y components between the motion vector calculated at location pixel location (m, n) and the subblock MV.

Let the coordinate of the top-left sample of the subblock be (0,0), the center of the subblock is $$\left(\frac{sbW}{2}, \frac{sbH}{2}\right).$$

Given the affine motion parameters a, b, c, and d, $\Delta v_x(m, n)$ and $\Delta v_y(m, n)$ can be derived as:

$$\Delta v_x(m, n) = a*\left(m - \frac{sbW}{2}\right) + b*\left(n - \frac{sbH}{2}\right)$$

$$\Delta v_y(m, n) = c*\left(m - \frac{sbW}{2}\right) + d*\left(n - \frac{sbH}{2}\right)$$

In the control-points based affine motion model, the affine motion parameters a, b, c, and d may be calculated from the CPMVs as:

$$a = \frac{(v_{1x} - v_{0x})}{blkW}$$

$$b = \frac{(v_{2x} - v_{0x})}{blkH}$$

$$c = \frac{(v_{1y} - v_{0y})}{blkW}$$

$$d = \frac{(v_{2y} - v_{0y})}{blkH}$$

Figure 3:
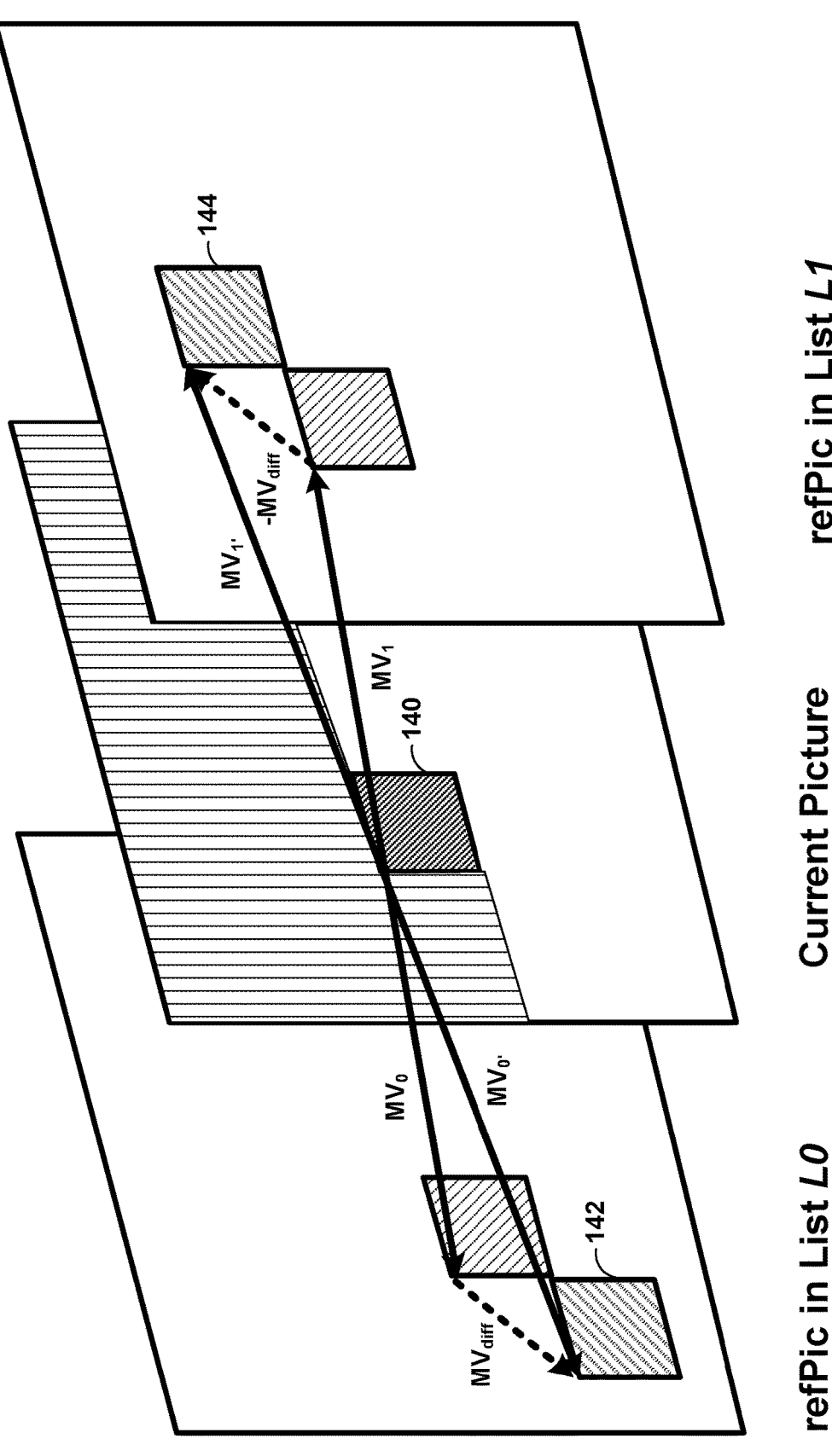
FIG. 3 is a conceptual diagram illustrating an example of decoder-side motion vector refinement (DMVR) using bilateral matching.

FIG. 3 is a conceptual diagram illustrating an example of decoder-side motion vector refinement (DMVR) using bilateral matching. In ITU-T H.266/Versatile Video Coding (VVC), the bilateral-matching based decoder side motion vector refinement (DMVR) is applied to increase the accuracy of the MVs of a bi-prediction merge candidate. The BM method calculates the SAD between the two candidate blocks in the reference picture list L0 and list L1.

As illustrated in FIG. 3, the sum of absolute difference (SAD) between reference blocks 142 and 144 based on each MV candidate around the initial MV ($MV_0$, $MV_1$) may be calculated for current block 140. The MV candidate with the lowest SAD ($MV_0'$, $MV_1'$) becomes the refined MV and is used to generate the bi-predicted signal. The SAD of the initial MVs is subtracted by ¼ of the SAD value to serve as regularization term. The temporal distances (i.e., Picture Order Count (POC) difference) from two reference pictures to the current picture may be the same. Therefore, the MVD0 may have the opposite sign of MVD1.

In VVC, the refinement search range is two integer luma samples from the initial MV. The searching includes the integer sample offset search stage and fractional sample refinement stage. Twenty-five (25) points full search may be applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in raster scanning order. The point with the smallest SAD is selected as the output of integer sample offset searching stage.

In H.266/VVC, the integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C \qquad (1)$$

where ($x_{min}$,$y_{min}$) corresponds to the fractional position with the least cost and C corresponds to the minimum cost value. By solving the above equations by using the cost value of the five search points, the ($x_{min}$,$y_{min}$) may be computed as:

$$x_{min}=(E(-1,0)-E(1,0))/(2(E(-1,0)+E(1,0)-2E(0,0))) \qquad (1)$$

$$y_{min}=(E(0,-1)-E(0,1))/(2((E(0,-1)+E(0,1)-2E(0,0))) \qquad (2)$$

The value of $x_{min}$ and $y_{min}$ are automatically constrained to be between −8 and 8, since all cost values are positive and the smallest value is E(0,0). This corresponds to a half pel offset with ¹⁄₁₆th-pel MV accuracy in VVC. The computed fractional ($x_{min}$,$y_{min}$) are added to the integer distance refinement MV to get the sub-pixel accurate refinement delta MV.

In VVC, the resolution of the MVs is ¹⁄₁₆ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process.

After the refined MV is attained with DMVR search process, the normal 8-tap interpolation filter is applied to generate the final prediction. In order to avoid accessing more reference samples than the normal motion compensation (MC) process, the samples, which is not needed for the interpolation process based on the original MV but is needed for the interpolation process based on the refined MV, will be padded from those available samples.

When the width and/or height of a CU are larger than 16 luma samples, the CU may be further split into subblocks with width and/or height equal to 16 luma samples for the DMVR process.

In VVC, DMVR can be applied to CUs coded with following modes and/or features:

CU level merge mode with bi-prediction MV

One reference picture is in the past and another reference picture is in the future with respect to the current picture The distances (i.e., POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block In Chen et al., "Non-EE2: DMVR for affine merge coded blocks," Joint Video Experts Team (JVET) of ITU-T SG 16 WP 3 and ISO/IEC JTC 1/SC 29, 27th Meeting, July 13-22, Document JVET-AA0144-v2 (hereinafter, "JVET-AA0144"), a decoder side motion vector refinement (DMVR) was proposed for bi-directional predicted affine merge candidate. A translation MV offset is added to all the CPMVs of the candidate in the affine merge list if the candidate meets the DMVR condition. And the MV offset is derived by minimizing the cost of bilateral matching, which is similar to the conventional DMVR. In JVET-AA0144, affine motion compensation is performed to generate predictors in both directions. The motion vector offset searching process is the same as the first pass of multi-pass DMVR (prediction unit level) in ECM. 3×3 square search pattern is used to loop through the search range [−8, +8] in horizontal direction and [−8, +8] in vertical direction to find the best integer MV offset. And then half pel search is conducted around the best integer position and an error surface estimation is performed at last to find a MV offset with ¹⁄₁₆ precision.

Video coders, such as video encoder 200 and video decoder 300, may also be configured to perform adaptive DMVR. In general, adaptive DMVR allows different coded blocks to be assigned different search strategies or methods for bilateral matching. Video encoder 200, for example, may select a search strategy and signal the search strategy in the bitstream using values for syntax elements encoded in the bitstream. In this manner, video decoder 300 may determine the search strategy using the values of the syntax elements. The search strategy may include constraints and/or relationships between MVD0 and MVD1 that may be imposed during the bilateral matching search process. Such constraints may include, for example, 1) mirroring MVD, in which MVD0 and MVD1 have the same magnitude but opposite sign, that is, MVD0=−MVD1 (original DMVR). As another example, 2) MVD0 may be 0 (i.e., both x and y components of MVD0 are zero), such that MVD0 is fixed when searching around MVD1 to derive refined MVD1', and MVD0' is set equal to MVD0 (adaptive DMVR). As still another example, 3) MVD1 may be 0, that is, MVD1 is fixed when searching around MVD0 to derive MVD0', and MVD1' is equal to MVD1 (adaptive DMVR).

A first syntax element may represent mode information (e.g., regular DMVR or adaptive DMVR). The three options described above may be classified by the first syntax element. Option 1) corresponds to regular DMVR being applied to a coded block when a regular merge candidate stratifies the DMVR conditions, while options 2) and 3) may be applied when the coded block uses the designated new merge mode, in which all candidates meet the designated DMVR conditions. Options 2) and 3) may be distinguished between each other using a mode flag or merge index.

Figure 4:
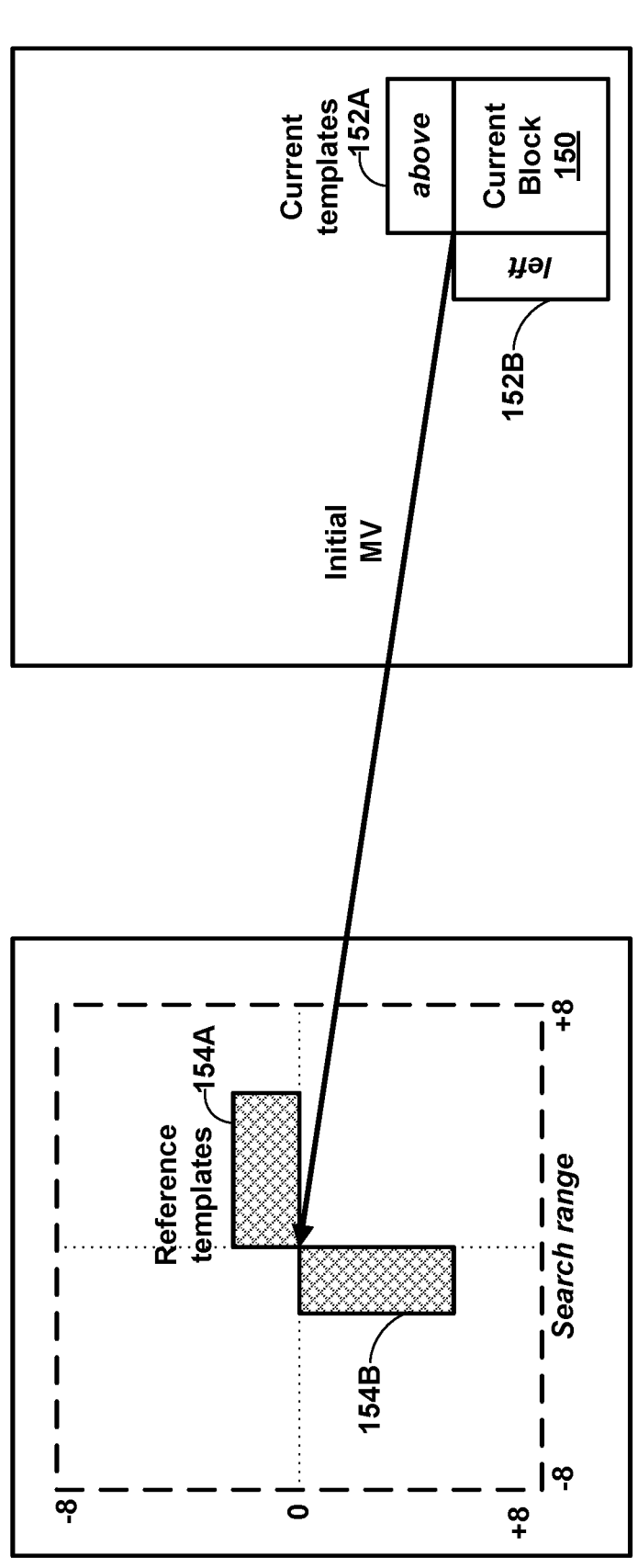
FIG. 4 is a conceptual diagram illustrating an example of DMVR using template matching.

FIG. 4 is a conceptual diagram illustrating an example of DMVR using template matching. Template matching is another example DMVR process. In template matching, an error measure, such as sum of absolute difference (SAD), may be minimized for a template area neighboring a current block relative to a reference area. For example, in FIG. 4, reference templates 154A, 154B may be identified that have a minimal error relative to above template area 152A and left template area 152B for current block 150. According to the techniques of this disclosure, similar template matching processes may be applied to refine CPMVs for a block predicted using affine mode.

Figure 5:
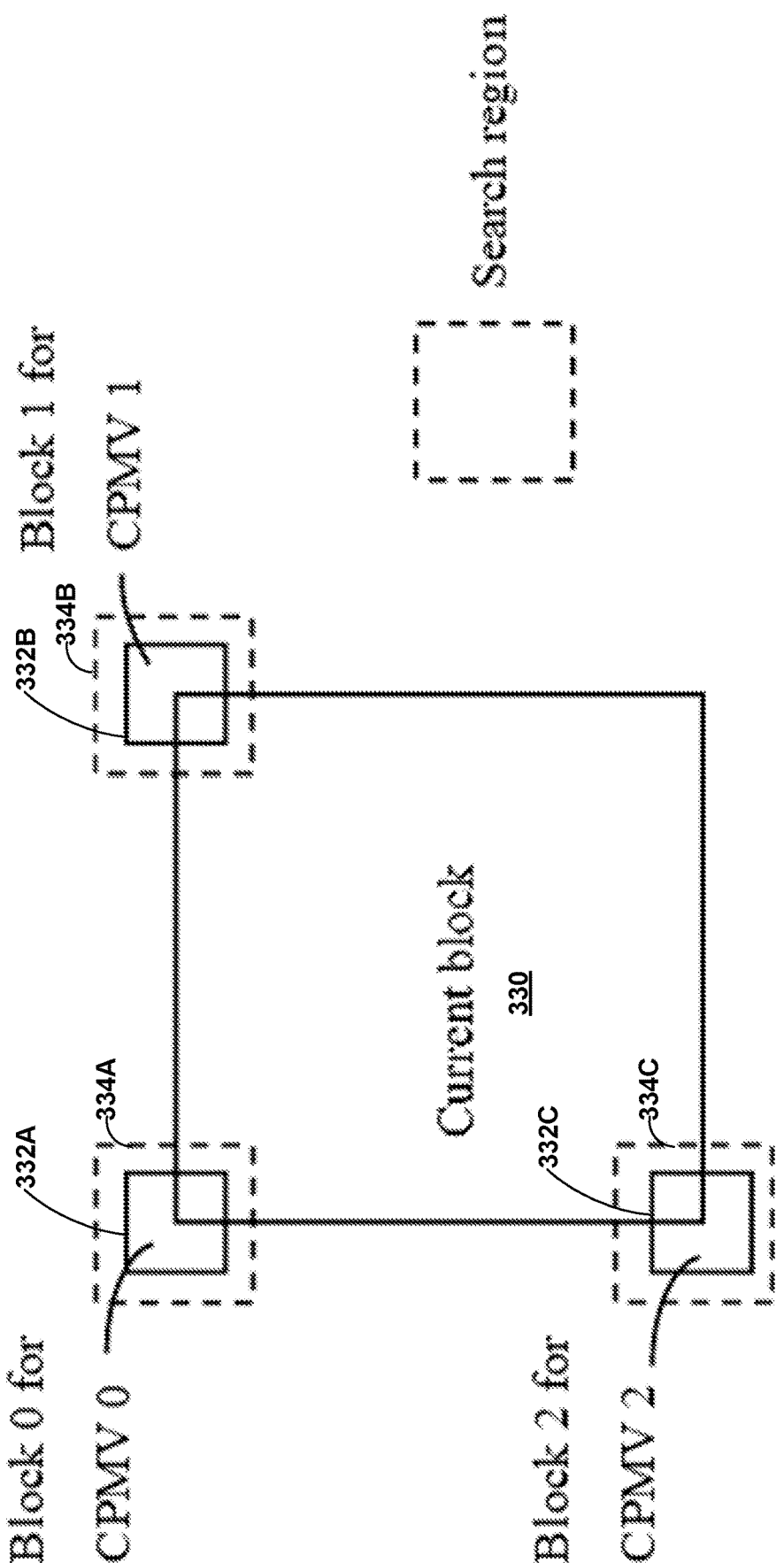
FIG. 5 is a conceptual diagram illustrating an example of individual control point motion vector (CPMV) refinement according to the techniques of this disclosure.

FIG. 5 is a conceptual diagram illustrating an example of individual control point motion vector (CPMV) refinement according to the techniques of this disclosure. In particular, FIG. 5 depicts current block 330 having representative blocks 332A, 332B, and 332C at, respectively, an upper-left corner, an upper-right corner, and a lower-left corner of current block 330. In this example, current block 330 is predicted using three CPMVs, each corresponding to a respective one of the upper-left corner, the upper-right corner, and the lower-left corner of current block 330.

According to the techniques of this disclosure, each of these CPMVs may be independently refined using DMVR techniques, such as those described with respect to the techniques of FIGS. 3 and 4 above. For example, as shown in FIG. 5, each of representative blocks 332A-332C is contained within a respective search area 334A-334C. To refine a CPMV associated with, for example, representative block 332A, video encoder 200 or video decoder 300 may perform a bilateral search or template matching search within search area 334A of one or more respective reference pictures indicated by original motion information for the CPMV to detect a motion vector that best reduces a cost value according to a cost measure, such as sum of absolute differences (SAD), sum of squared differences (SSD), mean absolute differences (MAD), mean squared differences (MSD), or the like. Video encoder 200 or video decoder 300 may independently refine each CPMV in a similar matter.

Video encoder 200 and video decoder 300 of FIG. 1 may be configured, according to the techniques of this disclosure, to perform DMVR to independently refine CPMVs of a block of video data predicted using affine mode. Whereas JVET-AA0144 describes refining only the e and f parameters of the affine motion model, i.e., the same offset is added to all the CPMVs, video encoder 200 and video decoder 300 may, per the techniques of this disclosure, perform decoder side CPMV refinement methods for affine motion model, including refining all 6 parameters (or 4 parameters for the 4 parameters model) using, e.g., bilateral matching or template matching. Without loss of generosity, in some examples of the techniques of this disclosure, the 6-parameter affine motion model that is represented by the 3 CPMVs at the corners of the current block are assumed. The methods for the 4-parameters affine motion model can be similarly derived.

Video encoder 200 and video decoder 300 may calculate a bilateral matching cost for a given bi-directional affine motion vector as follows. First, video encoder 200 or video decoder 300 may add an offset to each of the CPMVs in both directions to update the CPMVs. Video encoder 200 or video decoder 300 may then apply affine motion compensation according to the updated CPMVs to generate predictors in both directions. Video encoder 200 or video decoder 300 may then calculate may then calculate distortion between the generated predictors using a predefined cost criterion, such as sum of absolute differences (SAD), sum of squared differences (SSD), mean absolute differences (MAD), mean squared differences (MSD), or the like.

The affine motion compensation can be the same as that in VVC, i.e., subblock based motion compensation followed by prediction refinement with optical flow (PROF). Affine motion compensation may also be simplified relative to VVC. For example, PROF can be skipped, the subblock size can be bigger, and/or the interpolation filter can be bi-linear interpolation filter instead of the 6-tap or 8-tap interpolation filter of VVC. However, this is not the focus of this disclosure, and any type of affine motion compensation can be used to generate the predictors for the bilateral matching cost calculation.

In some examples, the DMVR process may be performed by video encoder 200 and video decoder 300 before processing motion vector difference (MVD) values for the CPMVs. That is, video encoder 200 may determine a merge candidate for a CPMV that closely matches the CPMV, perform a DMVR process for the CPMV to generate an intermediate refined CPMV, then calculate an MVD value representing the difference between the intermediate refined CPMV and the actual CPMV. Similarly, video decoder 300 may determine the merge candidate (e.g., using a merge index value received from video encoder 200), perform the DMVR process for the CPMV merge candidate to generate the intermediate refined CPMV, then apply the MVD value to the intermediate refined CPMV to reconstruct the actual CPMV.

Video encoder 200 and video decoder 300 may be configured to code data, such as high level syntax (HLS), a video parameter set (VPS), a sequence parameter set (SPS), a picture parameter set (PPS), a picture header, a slice header, or a block header, to control whether the described techniques are applied to an affine merge candidate.

In some examples, video encoder 200 and video decoder 300 may independently refine each CPMV using regular DMVR (e.g., bilateral matching) of a representative block. As noted above, in FIG. 5, each CPMV may be associated with a respective one of representative blocks 332A-332C. Video encoder 200 or video decoder 300 may search each CPMV within search areas 334A-334C, respectively, based on, e.g., bilateral matching or template matching of representative blocks 332A-332C.

Representative blocks 332A-332C may be blocks that contain the CPMV location, e.g., corner samples of current block 330. For example, representative block 332A may be a block including the CPMV location as its center, i.e., the coordinates of the top-left sample of the block, which may be is (xk-halfDx, yk-halfDy), wherein (xk, yk) is the coordinate of the CPMV, halfDx is half the width of representative block 332A, and halfDy is half the height of representative block 332A. Examples of halfDx and halfDy include 2, 4, 8, or the like (e.g., other power-of-two values).

The block width and height can also be adaptive depending on the width and height of current block 330. Various methods of regular DMVR for the presentative block may be applied, for example, various search patterns, cost criterions, or the like.

The input and output of the process are the CPMVs of both prediction directions, denoted as mvAffineInit[i][k] and mvAffineBest[i][k], where i∈{0, 1} represents the index of prediction direction, and k∈{0, 1, 2} represents the index of the CPMV. For each k in {0, 1, 2}, video encoder 200 and video decoder 300 may perform regular DMVR for the representative block k using mvAffineInit[i][k], i=0, 1 as input, and output cpmv[i][k]. In this example, cpmv[0][k] =mvAffineInit [0][k]+mvOffset[k], cpmv[1][k]=mvAffine-Init [1][k]−mvOffset[k].

In some examples, mvAffineBest[i][k] is set equal to cpmv[i][k] for all i=0, 1 and k=0, 1, 2.

In some examples, if the bilateral matching cost of the current block calculated using cpmv[i][k] is less than the cost calculated using mvAffineInit[i][k], then mvAffineBest [i][k] is set equal to cpmv[i][k], otherwise mvAffineBest[i] [k] is set equal to mvAffineInit[i][k], for all i=0, 1 and k=0, 1, 2.

In some examples, both mvAffineInit[i][k] and cpmv[i][k] are used as candidates for the CPMV k, then the mvAffine-Best[i][k] is set equal to the best combination of those candidates that generate the minimum bilateral matching cost for the current block. The following pseudo code is an example of the process:

```
Set cpmvCand[i][k][0] = mvAffineInit[i][k], and cpmvCand[i][k][1] =
cpmv[i][k], for all i = 0, 1 and k = 0, 1, 2:
    Set minCost equal to a predefined maximum value (max 64 bits integer
    value for example)
        Loop cpmvIdx0 from 0 to 1
            Loop cpmvIdx1 from 0 to 1
                Loop cpmvIdx2 from 0 to 1
                    cpmvTemp[i][0] is set equal to
                    cpmvCand[i][0][cpmvIdx0] for i = 0, 1
                    cpmvTemp[i][1] is set equal to
                    cpmvCand[i][1][cpmvIdx1] for i = 0, 1
                    cpmvTemp[i][2] is set equal to
                    cpmvCand[i][2][cpmvIdx2] for i = 0, 1
                    Calculate bilateral matching cost, denoted as
                    costTemp, for the current block using cpmvTemp[i][k],
                    i = 0, 1, k = 0, 1, 2.
                    If costTemp is less than minCost:
                        minCost is set equal to costTemp, and
                        mvAffineBest[i][k] is equal cpmvTemp[i][k], i =
                        0, 1, k = 0, 1, 2
```

The bilateral matching refinement process usually includes 3 stages. The first stage (stage 1) is to perform bilateral matching search with integer pixel (pel) precision, where the motion vector offset being added to the CPMV is in multiple of integer pels. The second stage (stage 2) is to perform bilateral matching search with fractional pel preci-sion where the motion vector offset being added to the CPMV is in multiple of fractional pels. The last stage (stage 3) adopts the parametric error surface model to estimate the best motion vector offsets based on the data from the fractional pel stage (stage 2). The output CPMVs from either stage 1 or stage 2 can be used as a replacement of the final output of bilateral matching search result. This can be applied to all the three examples mentioned above, where cpmv[i][k] may be assumed to be the CPMV output from stage 3 and can be replaced with CPMV output from either stage 1 or stage 2.

In the third example mentioned above, not only the final stage CPMV output cpmv[i][k], but also the CPMV input to the bilateral matching search process mvAffineInit[i][k] can be replaced by the stage 1 or stage 2 output. Either mvAffi-neInit[i][k] or cpmv[i][k] may be replaced with CPMV output from stage 1 or stage 2, or both can be replaced at the same time.

When performing bilateral matching search in stage 1 and stage 2, video encoder 200 or video decoder 300 may compute the bilateral matching cost. Based on the bilateral matching cost, video encoder 200 or video decoder 300 may order the corresponding CPMV offset (or equivalently the output CPMV) and use the best N result(s) in the third example mentioned above to search for the best CPMV combination. With the best N result for each of the CPMV, the loop becomes:

```
Loop cpmvIdx0 from 0 to N
    Loop cpmvIdx1 from 0 to N
        Loop cpmvIdx2 from 0 to N
            ...
```

For different CPMV positions (top-left CPMV, top-right CPMV, bottom-left CPMV, etc.) different numbers of can-didates can be used, where the loop may be further adapted to:

```
Loop cpmvIdx0 from 0 to L
    Loop cpmvIdx1 from 0 to M
        Loop cpmvIdx2 from 0 to N
            ...
```

Instead of performing bilateral matching to refine each of the CPMVs for both directions in the process mentioned above, video encoder 200 and video decoder 300 may perform an adaptive bilateral matching search as a replace-ment or additional option for refining any or all the CPMVs for either of the directions.

When used as a replacement, cpmv[i][k], which is origi-nally assumed to be the bilateral matching search result, may be replaced with the adaptive bilateral matching search results. It is not only possible to replace all the CPMVs bilateral matching search results with adaptive bilateral matching search results, but also possible to replace a subset of the CPMVs with adaptive bilateral matching search results. It is also possible to replace one CPMV with adaptive bilateral matching search result for reference list 0 and meanwhile replace another CPMV with adaptive bilat-eral matching search result for reference list 1.

Instead of replacement, the adaptive bilateral matching search results can be additionally used as new varieties in searching for the best combination of refined CPMVs. In one example, both the adaptive bilateral matching search result for reference list 0 and reference list 1 may be added to the for loop, as follows:

```
Set cpmvCand[i][k][0] = mvAffineInit[i][k], cpmvCand[i][k][1] = cpmv[i][k],
cpmvCand[i][k][2] = cpmvadaptL0[i][k] and cpmvCand[i][k][3] = cpmv
adaptL1[i][k], for all i = 0, 1 k = 0, 1, 2 and j = 0, 1, 2, where
cpmvadaptL0 and cpmvadaptL1 are the adaptive BM search result.
```

-continued

```
Set minCost equal to a predefined maximum value (max 64 bits integer value for
   example)
Loop cpmvIdx0 from 0 to 3
   Loop cpmvIdx1 from 0 to 3
      Loop cpmvIdx2 from 0 to 3
         cpmvTemp[i][0] is set equal to
            cpmvCand[i][0][cpmvIdx0] for i = 0, 1
         cpmvTemp[i][1] is set equal to
            cpmvCand[i][1][cpmvIdx1] for i = 0, 1
         cpmvTemp[i][2] is set equal to
            cpmvCand[i][2][cpmvIdx2] for i = 0, 1
         ...
```

Since the adaptive bilateral matching search requires additional operations and computation, the overall CPMV search complexity will be increased. To avoid the additional bilateral matching search, in one example, the bilateral matching search result can be used to generate pseudo adaptive search results, for example, for the first CPMV cpmv[i][0], to generate a pseudo adaptive list 0 result, cpmv[0][0] remains unchanged, while cpmv[1][0] is replaced with the initial input MV mvAffineInit[1][0].

The CPMV refinement may not necessarily be performed on all CPMVs. Early termination may be applied, based on prior search result information. Above, the basic concept of affine DMVR was introduced. When CPMV search is used as a successive step after affine DMVR, the information from prior affine DMVR steps can be used to judge if CPMV refine for a certain CPMV is needed. Since affine mode is a sub-block mode and each of the sub-blocks has a different MVs, motion compensation may be performed on each of the sub-blocks, and hence, the bilateral matching cost computation is also usually performed on a sub-block basis. In this case, the bilateral matching cost of each of the sub-blocks will be determined.

The CPMV search is performed on a square block centered by the CPMV coordinates and with a similar block size to the affine sub-block size. Therefore, the bilateral matching cost of a sub-block that is close to the CPMV coordinate is potentially a good candidate to use to determine early termination. Let the threshold for CPMV search early termination be referred to as "Thred." In one example, the bilateral matching cost of the top-left sub-block is compared against Thred, and if smaller than Thred, the CPMV search for the top-left CPMV may be skipped. The same rule can be applied to the top-right and bottom-left CPMV. In a second example, the average bilateral matching cost of several sub-blocks that are close to the CPMV location is used, instead of a single sub-block. For example, the top-left sub-block and the sub-block to the right may be used.

The CPMV locations in the process are not necessarily the corners of current block 330. In some examples, the CPMV locations may be locations inside current block 330. The output CPMVs of the process can be mapped to the desired locations (corners of the current block for example).

Some size constraints to the current block may be applied. For example, these techniques may only be applicable if the area of the current block is larger than a predefined threshold, such as 256 samples. In another example, the techniques may only be applicable if the width and height of the current block are larger than a predefined threshold, such as 8 or 16 samples. In yet another example, the techniques may only be applicable if the area of the current block is within the certain range, for example, 256 to 4096 samples. In yet another example, the techniques may only be applicable if the width and height of the current block are within a certain range, for example, 16 to 64 samples.

In some examples, video encoder 200 and video decoder 300 may be configured to iteratively refine CPMVs of current block 330 to minimize a DMVR cost (e.g., bilateral matching cost) of current block 330. In one iteration, video encoder 200 and video decoder 300 may perform the process to loop over all CPMVs, and refine a current CPMV while keeping the other CPMVs unchanged. The input and output of the process are the CPMVs of both prediction directions, denoted as mvAffineInit[i][k] and mvAffineBest[i][k], wherein i=0, 1 represents the index of prediction direction, and k=0, 1, 2 represents the index of the CPMV.

```
The following pseudo code is an example of one iteration of all CPMVs:
mvOffset[j], j = 0, 1, ..., N-1 is an array of possible offset for the CPMV.
   Set minCost equal to a predefined maximum value (max 64 bits integer value for
example)
   mvAffineBest[i][k] is set equal to mvAffineInit[i][k] for i = 0, 1, k = 0, 1, 2.
   Loop over CPMV k, k = 0, 1, 2:
      cpmvTemp[i][0] is set equal to mvAffineBest[i][0][cpmvIdx0] for i = 0, 1
      cpmvTemp[i][1] is set equal to mvAffineBest[i][1][cpmvIdx1] for i = 0, 1
      cpmvTemp[i][2] is set equal to mvAffineBest[i][2][cpmvIdx1] for i = 0, 1
      Loop over mvOffset[j], 0, 1, ..., N-1:
         cpmvTemp[0][k] is set equal to cpmvTemp[0][k]+mvOffset[j]
         cpmvTemp[1][k] is set equal to cpmvTemp[1][k]−mvOffset[j]
         Calculate bilateral matching cost, denoted as costTemp, for the current
      block using cpmvTemp[i][k], i = 0, 1, k = 0, 1, 2.
         If costTemp is less than minCost:
            minCost is set equal to costTemp, and mvAffineBest[i][k] is equal
         cpmvTemp[i][k], i = 0, 1, k = 0, 1, 2
```

Video encoder 200 and video decoder 300 may be configured to apply an early termination to the process above. For example, if the minCost is less than a threshold, then the process may stop. As another example, if all CPMVs do not change during one iteration, then the process may stop.

In some examples, these techniques may only be performed for certain sizes of current block 330, e.g., based on width, height, and/or area of current block 330.

Adding an offset to one CPMV may change the whole sub-block motion vector field. Subsequently, motion compensation may be performed for each of the sub-blocks to recalculate the bilateral matching cost. However, it may be sufficient to use a sub-sampled version of the sub-blocks as representatives of the whole CU in computing the bilateral matching cost for the whole CU and the sub-sampled bilateral matching cost is used to determine the best MV offset for the current CPMV that is being refined. For example, the methods disclosed in U.S. Provisional Application No. 63/377,659, filed Sep. 29, 2022, entitled "METHODS OF SUBBLOCK SKIPPING FOR AFFINE MOTION SEARCH FOR VIDEO CODING," can be used. Only after the best MV offset is determined will the bilateral matching cost of the whole CU be computed and compared with the previous best bilateral matching cost. In yet another example, the sub-sampled sub-block bilateral matching cost may be used throughout the process, in which the bilateral matching cost of the initial input candidate is also derived from the sub-sampled version of the sub-blocks.

The various techniques above may be performed alone or in combination. In one example, the output of one technique may be used as the input to the other technique or vice versa.

In some examples, the techniques described above may further be used to perform decoder side motion vector refinement for affine merge with motion vector difference (MMVD) mode. The affine MMVD mode is similar to the MMVD mode, in that in affine MMVD mode, a merge index is signaled to indicate the base affine merge candidate, then the MVD information is signaled. Video encoder 200 and video decoder 300 may add the MVD to each of the control point motion vectors of the base affine merge candidate to generate the final affine motion vectors. The MVD information may include an index to specify motion magnitude and an index indicating motion direction. A distance index may specify motion magnitude information and indicate a predefined offset from a starting point. A direction index may represent the direction of the MVD relative to the starting point.

The control point motion vector refinement methods can be applied after the MVD is added to each of the control point motion vectors of the base affine merge candidate. Usage of MVD in affine MMVD mode may be similar to application of an offset, e.g., the same values may be added to each of the control point motion vectors, and only the e and f parameters of the affine motion model are refined. Therefore, performing the refinement method as proposed in JVET-AA0144 might not be efficient for affine MMVD mode, as the offset is already signaled in the bitstream by the encoder. The control point motion vector refinement methods, however, can further improve the affine motion by refining the other parameters (a, b, c, and d) of the affine model.

In yet another example, the affine MMVD based candidates are first refined before the MVD is added to the refined candidate. The various versions of affine DMVR refinement techniques can be applied solely or cascaded on the affine MMVD base candidates. For example, any of the affine DMVR method introduced above, as well as any possible combination of these methods, may be performed.

Figure 6:
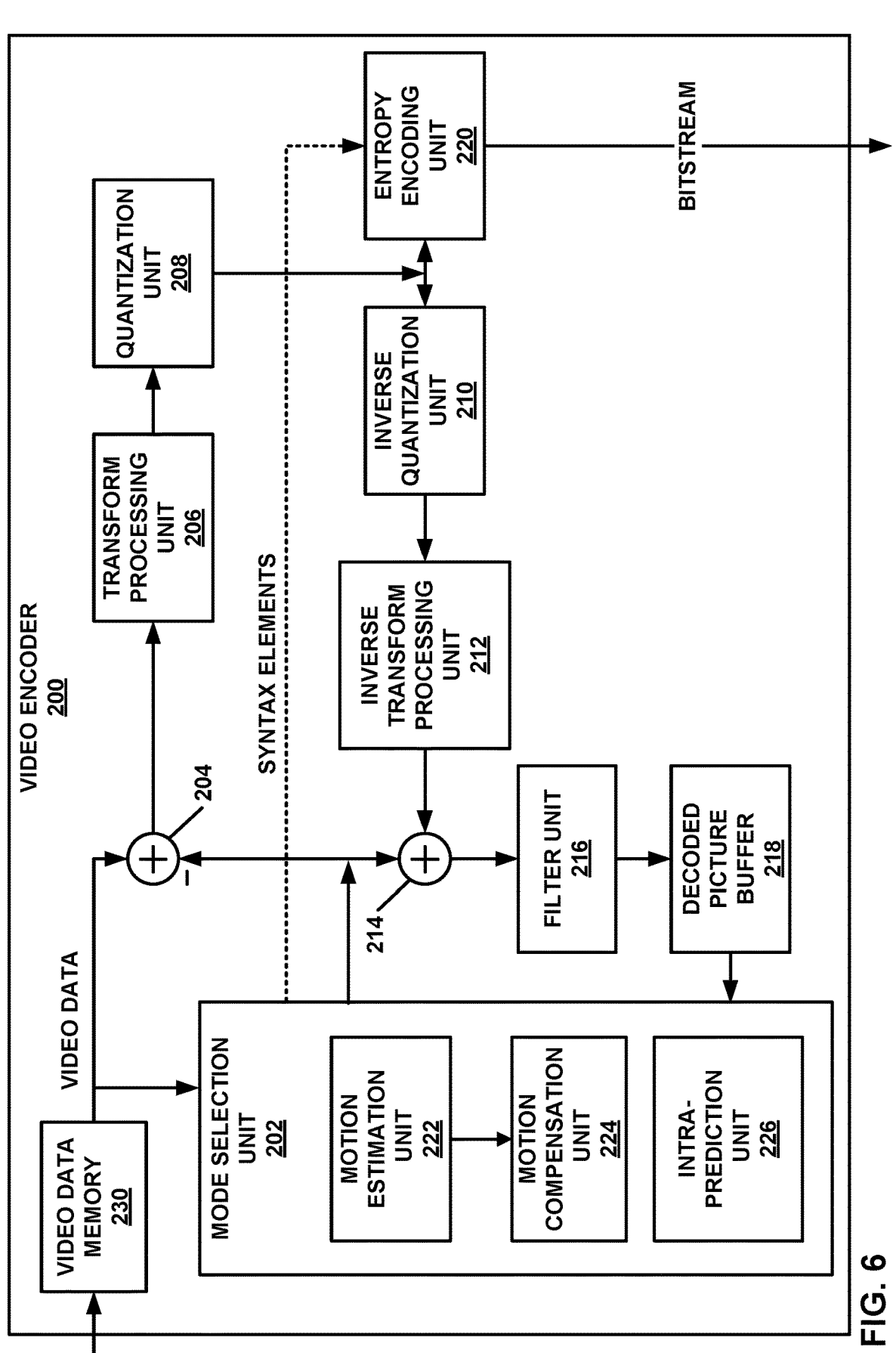
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like. In some examples, motion compensation unit 224 may be configured to perform affine motion compensation.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When performing affine motion compensation, according to the techniques of this disclosure, motion compensation unit 224 may receive actual CPMVs to be used to predict a current block, e.g., from motion estimation unit 222. Motion compensation unit 224 may determine merge candidates for the CPMVs that closely match the actual CPMVs. Motion compensation unit 224 may then perform independent and distinct DMVR processes on each of the CPMV merge candidates to generate intermediate refined CPMVs according to, e.g., the process described above with respect to FIG. 5. Motion compensation unit 224 may then calculate motion vector difference (MVD) values representing differences between the actual CPMVs and the corresponding intermediate refined CPMVs. Motion compensation unit 224 may use the actual CPMVs to generate the prediction block for the current block, and provide merge indexes and the MVDs to entropy encoding unit 220. The MVD values may represent lengths and directions of offsets to be applied to the intermediate refined CPMVs.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction. Motion compensation unit 224 may, when performing affine mode prediction, individually refine each control point motion vector according to any of the various techniques of this disclosure, alone or in any combination.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 7:
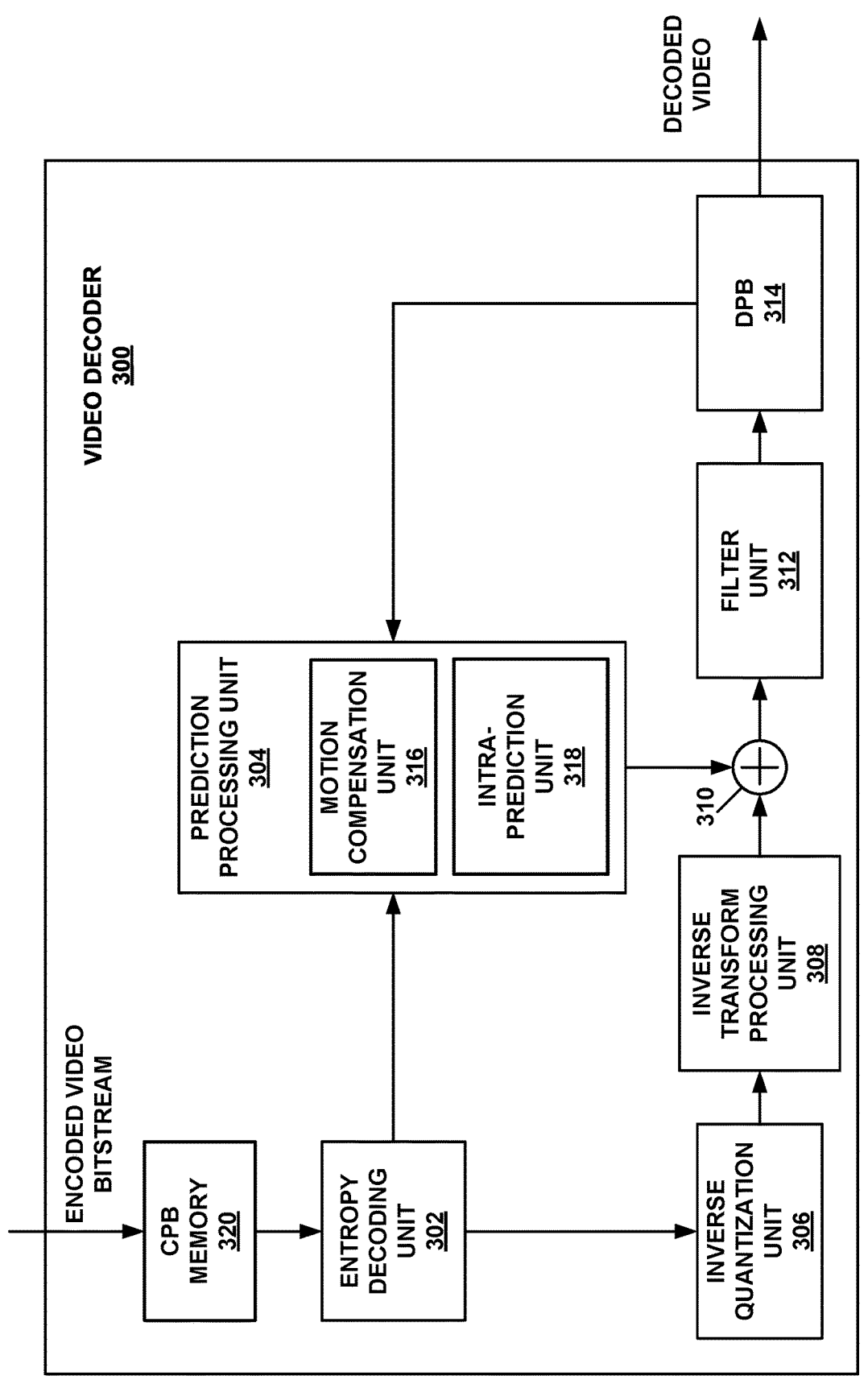
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components. Motion compensation unit 316 may, when performing affine mode prediction, individually refine each control point motion vector according to any of the various techniques of this disclosure, alone or in any combination.

When performing affine motion compensation, according to the techniques of this disclosure, motion compensation unit 316 may receive merge candidates and MVD values for each of the CPMVs to be used to form the prediction block. Motion compensation unit 316 may determine merge candidates for the CPMVs according to merge indexes received from entropy decoding unit 302. Motion compensation unit 316 may then perform independent and distinct DMVR processes on each of the CPMV merge candidates to generate intermediate refined CPMVs according to, e.g., the process described above with respect to FIG. 5. Motion compensation unit 316 may receive MVD values representing differences between the actual CPMVs from entropy decoding unit 302. The MVD values may represent lengths and directions of offsets to be applied to the intermediate refined CPMVs. Motion compensation unit 316 may apply the MVD values to the corresponding intermediate refined CPMVs to reconstruct the actual CPMVs. Motion compensation unit 316 may use the actual CPMVs to generate the prediction block for the current block.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

FIG. 8 is a flowchart illustrating an example method for encoding a current block in accordance with the techniques of this disclosure. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block using affine mode. When forming the prediction block using affine mode, video encoder 200 may refine each control point motion vector individually according to any of the various techniques of this disclosure, alone or in any combination. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may then store the decoded block in DPB 218 (366).

Figure 9:
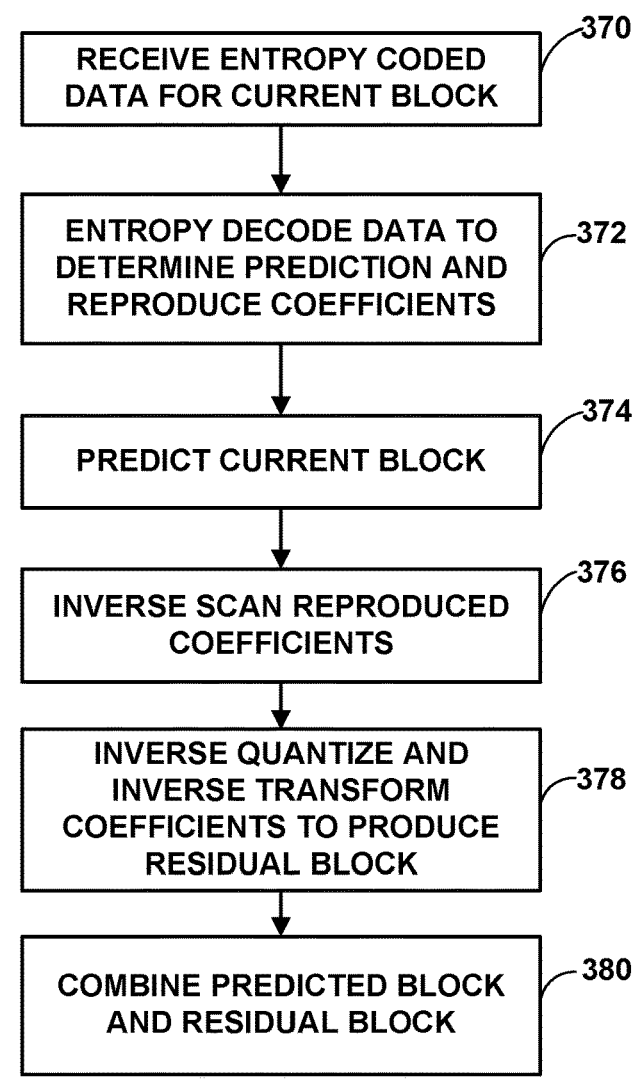
FIG. 9 is a flowchart illustrating an example method for decoding a current block in accordance with the techniques of this disclosure.

FIG. 9 is a flowchart illustrating an example method for decoding a current block of video data in accordance with the techniques of this disclosure. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using affine prediction mode, as indicated by the prediction information for the current block, to calculate a prediction block for the current block. When forming the prediction block using affine mode, video decoder 300 may refine each control point motion vector individually according to any of the various techniques of this disclosure, alone or in any combination. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 10:
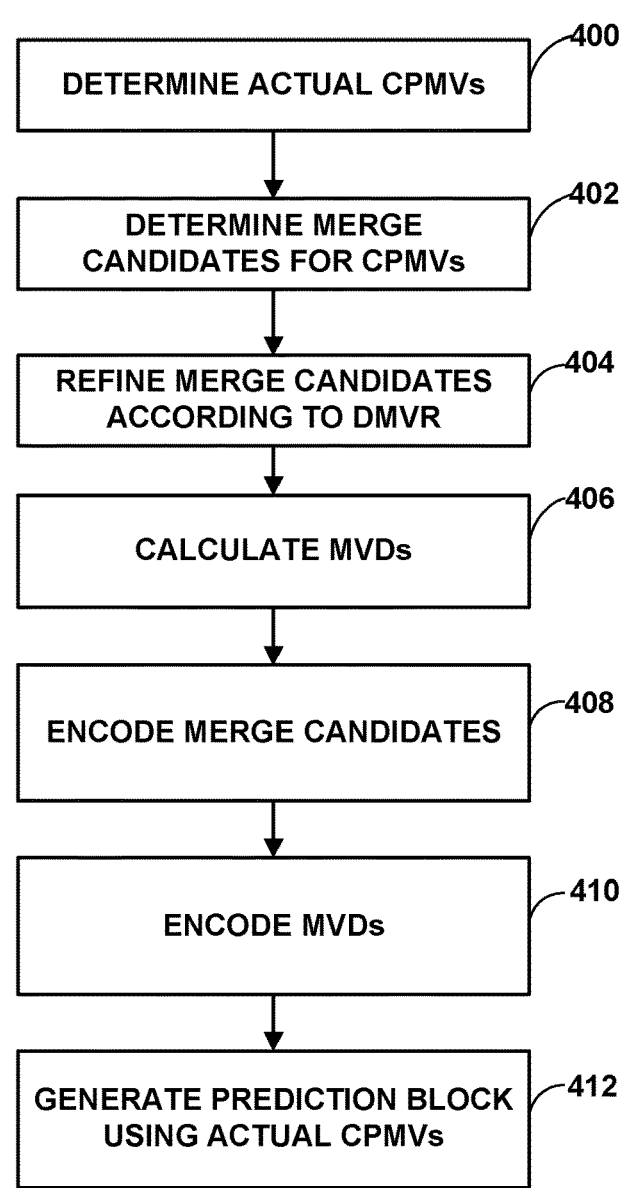
FIG. 10 is a flowchart illustrating an example method for encoding a current block using refined control point motion vectors (CPMVs) when performing affine motion compensation in accordance with the techniques of this disclosure.

FIG. 10 is a flowchart illustrating an example method for encoding a current block using refined control point motion vectors (CPMVs) when performing affine motion compensation in accordance with the techniques of this disclosure. The method of FIG. 10 is described with respect to video encoder 200 of FIGS. 1 and 6 for purposes of example. In other examples, other devices may perform this or a similar method.

Initially, video encoder 200 determines actual CPMVs to be used to generate a prediction block (400). Video encoder 200 may then determine, for each of the CPMVs, a merge candidate including a closest matching motion vector to the CPMV (402). For example, video encoder 200 may construct a merge candidate list and test each merge candidate in the merge candidate list to determine which of the merge candidates includes a motion vector closest to the actual CPMV.

Video encoder 200 may then refine the determined merge candidates according to DMVR (404), e.g., according to the techniques discussed above with respect to FIG. 5, to generate intermediate refined CPMVs. Video encoder 200 may then calculate motion vector difference (MVD) values representing differences between the actual CPMVs and the intermediate refined CPMVs (406). The MVD values may include a magnitude value and a direction value, where the magnitude value indicates an amount of offset to be applied to the intermediate refined CPMV and the direction indicates a direction in which to apply the magnitude to reconstruct the actual CPMV.

Video encoder 200 may then encode the merge candidates (408) and encode the MVDs (410). For example, video encoder 200 may encode merge indexes identifying the selected merge candidates in the merge candidate lists to encode the merge candidates. To encode the MVD values, video encoder 200 may encode a distance index representing the magnitude of the MVD value and a direction index representing the direction for the MVD value.

Moreover, video encoder 200 may use the actual CPMVs to generate the prediction block (412). For example, video encoder 200 may perform affine motion compensation using the actual CPMVs. Video encoder 200 may further use the prediction block to encode the current block, e.g., as discussed above with respect to FIG. 8. Similarly, video encoder 200 may reconstruct (i.e., decode) the current block using the prediction block.

In this manner, the method of FIG. 10 represents an example of a method of encoding a block of video data including refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and encoding the current block using the prediction block.

Figure 11:
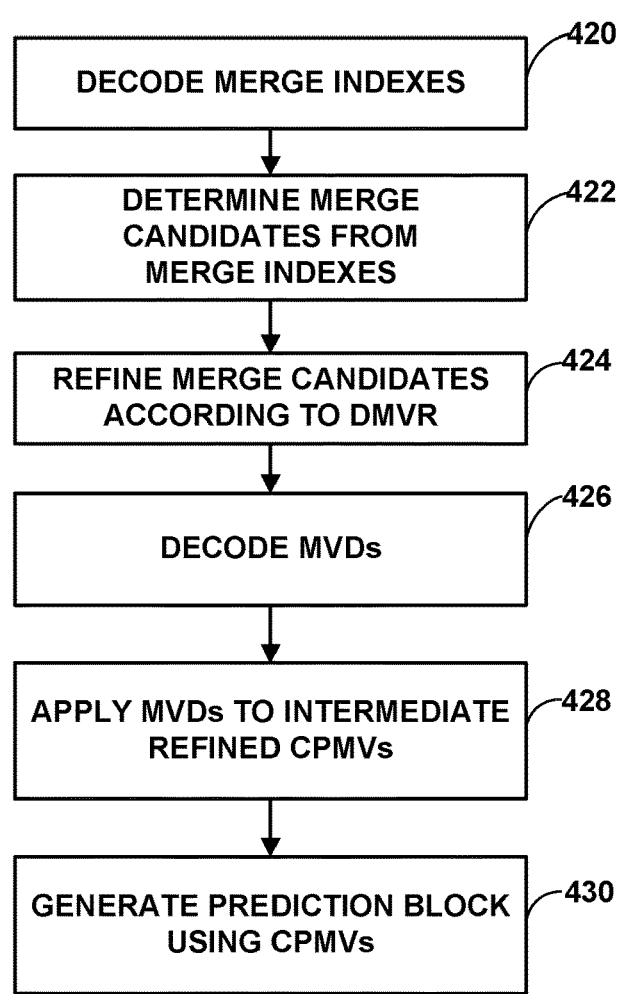
FIG. 11 is a flowchart illustrating an example method for decoding a current block using refined CPMVs when performing affine motion compensation in accordance with the techniques of this disclosure.

FIG. 11 is a flowchart illustrating an example method for decoding a current block using refined CPMVs when performing affine motion compensation in accordance with the techniques of this disclosure. The method of FIG. 11 is described with respect to video decoder 300 of FIGS. 1 and 7 for purposes of example. In other examples, other devices may perform this or a similar method.

Initially, video decoder 300 may decode merge indexes (420). Video decoder 300 may also construct merge candidate lists for respective CPMVs of a current block of video data. Video decoder 300 may determine merge candidates in the merge candidate lists at positions indicated by the decoded merge indexes (422). Video decoder 300 may then refine the merge candidates according to DMVR (424) to construct refined intermediate CPMVs.

Video decoder 300 may also decode MVDs for the intermediate refined CPMVs (426). The MVDs may include a magnitude component, represented by a magnitude index, and a direction component, represented by a direction index. Video decoder 300 may determine the magnitude and the direction from the magnitude index and the direction index, respectively. Video decoder 300 may then apply the MVDs to the intermediate refined CPMVs (428). For example, video decoder 300 may add the magnitudes in the directions indicated by the direction components to the intermediate refined CPMVs to reconstruct the CPMVs. Video decoder 300 may then generate a prediction block using the reconstructed CPMVs.

In this manner, the method of FIG. 11 represents an example of a method of decoding a block of video data including refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block.

Various examples of the techniques of this disclosure are summarized in the following clauses:

Clause 1: A method of decoding video data, the method comprising: refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block.

Clause 2: The method of clause 1, wherein the first DMVR process comprises a first bilateral matching process, and wherein the second DMVR process comprises a second, different bilateral matching process.

Clause 3: The method of any of clauses 1 and 2, further comprising refining a third CPMV of the current block of video data using a third DMVR process, independently of the first DMVR process and the second DMVR process, to form a third refined CPMV for the current block, wherein forming the prediction block for the current block comprises forming the prediction block using the first refined CPMV, the second refined CPMV, and the third refined CPMV.

Clause 4: The method of any of clauses 1-3, wherein the first CPMV of the current block corresponds to an upper-left corner sample of the current block, and wherein the first DMVR process includes performing a search for a first representative block including the upper-left corner sample of the current block, and wherein the second CPMV of the current block corresponds to an upper-right corner sample of the current block, and wherein the second DMVR process includes performing a search for a second representative block including the upper-right corner sample of the current block.

Clause 5: The method of clause 4, wherein the first representative block includes the upper-left corner sample of the current block at a center of the first representative block, and wherein the second representative block includes the upper-right corner sample of the current block at a center of the second representative block.

Clause 6: The method of any of clauses 4 and 5, wherein the first representative block is a first 4×4 sample block, and wherein the second representative block is a second 4×4 sample block.

Clause 7: The method of any of clauses 1-6, wherein the first DMVR process generates a first CPMV offset, and wherein refining the first CPMV comprises applying the first CPMV offset to the first CPMV, and wherein the second DMVR process generates a second CPMV offset, different from the first CPMV offset, and wherein refining the second CPMV comprises applying the second CPMV offset to the second CPMV.

Clause 8: The method of any of clauses 1-7, further comprising coding data indicating that the first and second CPMVs are to be refined, the data forming part of at least one of a video parameter set (VPS), a sequence parameter set (SPS), a picture parameter set (PPS), a picture header, a slice header, or a block header.

Clause 9: The method of any of clauses 1-8, wherein the first DMVR process includes: analyzing a first set of reference blocks of a first reference picture of a first reference picture list for a current picture including the current block; analyzing a second set of reference blocks of a second reference picture of a second reference picture list for the current picture; determining whether a first best-performing reference block of the first set of reference blocks performs better than a second best-performing reference block of the second set of reference blocks; and refining the first CPMV using either the first best-performing reference block or the second best-performing reference block according to whether the first best-performing reference block performs better than the second best-performing reference block, and wherein the second DMVR process includes: analyzing a third set of reference blocks of a third reference picture of the first reference picture list for the current picture; analyzing a fourth set of reference blocks of a fourth reference picture of the second reference picture list for the current picture; determining whether a third best-performing reference block of the third set of reference blocks performs better than a fourth best-performing reference block of the fourth set of reference blocks; and refining the second CPMV using either the third best-performing reference block or the fourth best-performing reference block according to whether the third best-performing reference block performs better than the fourth best-performing reference block.

Clause 10: The method of any of clauses 1-9, wherein refining the second CPMV comprises, after refining the first CPMV, refining the second CPMV based on the first refined CPMV.

Clause 11: The method of any of clauses 1-10 and 30-32, further comprising encoding the current block prior to decoding the current block.

Clause 12: A device for decoding video data, the device comprising one or more means for performing the method of any of clauses 1-11 and 30-32.

Clause 13: The device of clause 12, wherein the one or more means comprise one or more processors implemented in circuitry.

Clause 14: The device of any of clauses 12 and 13, further comprising a display configured to display the decoded video data.

Clause 15: The device of any of clauses 12-14, wherein the device comprises one or more of a camera, a computer, a mobile device, a broadcast receiver device, or a set-top box.

Clause 16: The device of clause 12-15, further comprising a memory configured to store the video data.

Clause 17: A computer-readable storage medium having stored thereon instructions that, when executed, cause a processor of a device for decoding video data to perform the method of any of clauses 1-11 and 30-32.

Clause 18: A device for decoding video data, the device comprising: means for refining a first control point motion vector (CPMV) of a current block of video data using a first decoder-side motion vector refinement (DMVR) process to form a first refined CPMV for the current block; means for refining a second CPMV of the current block of video data using a second DMVR process, independently of the first DMVR process, to form a second refined CPMV for the current block; means for forming a prediction block for the current block using the first refined CPMV and the second refined CPMV; and means for decoding the current block using the prediction block.

Clause 19: A method of decoding video data, the method comprising: refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block.

Clause 20: The method of clause 19, wherein the first DMVR process comprises a first bilateral matching process, and wherein the second DMVR process comprises a second, different bilateral matching process.

Clause 21: The method of clause 19, further comprising refining a third CPMV of the current block of video data using a third DMVR process, independently of the first DMVR process and the second DMVR process, to form a third refined CPMV for the current block, wherein forming the prediction block for the current block comprises forming the prediction block using the first refined CPMV, the second refined CPMV, and the third refined CPMV.

Clause 22: The method of clause 19, wherein the first CPMV of the current block corresponds to an upper-left corner sample of the current block, and wherein the first DMVR process includes performing a search for a first representative block including the upper-left corner sample of the current block, and wherein the second CPMV of the current block corresponds to an upper-right corner sample of the current block, and wherein the second DMVR process includes performing a search for a second representative block including the upper-right corner sample of the current block.

Clause 23: The method of clause 22, wherein the first representative block includes the upper-left corner sample of the current block at a center of the first representative block, and wherein the second representative block includes the upper-right corner sample of the current block at a center of the second representative block.

Clause 24: The method of clause 22, wherein the first representative block is a first 4×4 sample block, and wherein the second representative block is a second 4×4 sample block.

Clause 25: The method of clause 19, wherein the first DMVR process generates a first CPMV offset, and wherein refining the first CPMV comprises applying the first CPMV offset to the first CPMV, and wherein the second DMVR process generates a second CPMV offset, different from the first CPMV offset, and wherein refining the second CPMV comprises applying the second CPMV offset to the second CPMV.

Clause 26: The method of clause 19, further comprising coding data indicating that the first and second CPMVs are to be refined, the data forming part of at least one of a video parameter set (VPS), a sequence parameter set (SPS), a picture parameter set (PPS), a picture header, a slice header, or a block header.

Clause 27: The method of clause 19, wherein the first DMVR process includes: analyzing a first set of reference blocks of a first reference picture of a first reference picture list for a current picture including the current block; analyzing a second set of reference blocks of a second reference picture of a second reference picture list for the current picture; determining whether a first best-performing reference block of the first set of reference blocks performs better than a second best-performing reference block of the second set of reference blocks; and refining the first CPMV using either the first best-performing reference block or the second best-performing reference block according to whether the first best-performing reference block performs better than the second best-performing reference block, and wherein the second DMVR process includes: analyzing a third set of reference blocks of a third reference picture of the first reference picture list for the current picture; analyzing a fourth set of reference blocks of a fourth reference picture of the second reference picture list for the current picture; determining whether a third best-performing reference block of the third set of reference blocks performs better than a fourth best-performing reference block of the fourth set of reference blocks; and refining the second CPMV using either the third best-performing reference block or the fourth best-performing reference block according to whether the third best-performing reference block performs better than the fourth best-performing reference block.

Clause 28: The method of clause 19, wherein refining the second CPMV comprises, after refining the first CPMV, refining the second CPMV based on the first refined CPMV.

Clause 29: The method of clause 19, further comprising encoding the current block prior to decoding the current block.

Clause 30: The method of any of clauses 1-10, further comprising coding the first CPMV and the second CPMV using affine merge with motion vector difference (MMVD) mode.

Clause 31. The method of clause 30, wherein coding the first CPMV and the second CPMV using affine MMVD mode comprises: coding a first merge index for the first CPMV; coding a first motion vector difference (MVD) value for the first CPMV; coding a second merge index for the second CPMV; and coding a second MVD value for the second CPMV.

Clause 32. The method of clause 31, wherein coding the first MVD and the second MVD comprises: coding a first distance index representing a first motion magnitude for the first MVD; coding a first direction index representing a direction of the first MVD; coding a second distance index representing a second motion magnitude for the second MVD; and coding a second direction index representing a direction of the second MVD.

Clause 33: The method of clause 19, further comprising coding the first CPMV and the second CPMV using affine merge with motion vector difference (MMVD) mode.

Clause 34. The method of clause 33, wherein coding the first CPMV and the second CPMV using affine MMVD mode comprises: coding a first merge index for the first CPMV; coding a first motion vector difference (MVD) value for the first CPMV; coding a second merge index for the second CPMV; and coding a second MVD value for the second CPMV.

Clause 35. The method of clause 34, wherein coding the first MVD and the second MVD comprises: coding a first distance index representing a first motion magnitude for the first MVD; coding a first direction index representing a direction of the first MVD; coding a second distance index representing a second motion magnitude for the second MVD; and coding a second direction index representing a direction of the second MVD.

Clause 36: A method of decoding video data, the method comprising: refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block.

Clause 37: The method of clause 36, wherein refining the first CPMV comprises: determining a first predicted CPMV according to a first merge index value; refining the first predicted CPMV using the first DMVR process to form a first intermediate refined CPMV; decoding first motion vector difference (MVD) data; and adding the first MVD data to the first intermediate refined CPMV to form the first refined CPMV; and wherein refining the second CPMV comprises: determining a second predicted CPMV according to a second merge index value; refining the second predicted CPMV using the second DMVR process to form a second intermediate refined CPMV; decoding second motion vector difference (MVD) data; and adding the second MVD data to the second intermediate refined CPMV to form the second refined CPMV.

Clause 38: The method of clause 36, wherein the first DMVR process comprises a first bilateral matching process, and wherein the second DMVR process comprises a second, different bilateral matching process.

Clause 39: The method of clause 36, further comprising refining a third CPMV of the current block of video data using a third DMVR process, independently of the first DMVR process and the second DMVR process, to form a third refined CPMV for the current block, wherein forming the prediction block for the current block comprises forming the prediction block using the first refined CPMV, the second refined CPMV, and the third refined CPMV.

Clause 40: The method of clause 36, wherein the first CPMV of the current block corresponds to an upper-left corner sample of the current block, and wherein the first DMVR process includes performing a search for a first representative block including the upper-left corner sample of the current block, and wherein the second CPMV of the current block corresponds to an upper-right corner sample of the current block, and wherein the second DMVR process includes performing a search for a second representative block including the upper-right corner sample of the current block.

Clause 41: The method of clause 40, wherein the first representative block includes the upper-left corner sample of the current block at a center of the first representative block, and wherein the second representative block includes the upper-right corner sample of the current block at a center of the second representative block.

Clause 42: The method of clause 40, wherein the first representative block is a first 4×4 sample block, and wherein the second representative block is a second 4×4 sample block.

Clause 43: The method of clause 36, wherein the first DMVR process generates a first CPMV offset, and wherein refining the first CPMV comprises applying the first CPMV offset to the first CPMV, and wherein the second DMVR process generates a second CPMV offset, different from the first CPMV offset, and wherein refining the second CPMV comprises applying the second CPMV offset to the second CPMV.

Clause 44: The method of clause 36, further comprising coding data indicating that the first and second CPMVs are to be refined, the data forming part of at least one of a video parameter set (VPS), a sequence parameter set (SPS), a picture parameter set (PPS), a picture header, a slice header, or a block header.

Clause 45: The method of clause 36, wherein the first DMVR process includes: analyzing a first set of reference blocks of a first reference picture of a first reference picture list for a current picture including the current block; analyzing a second set of reference blocks of a second reference picture of a second reference picture list for the current picture; determining whether a first best-performing reference block of the first set of reference blocks performs better than a second best-performing reference block of the second set of reference blocks; and refining the first CPMV using either the first best-performing reference block or the second best-performing reference block according to whether the first best-performing reference block performs better than the second best-performing reference block, and wherein the second DMVR process includes: analyzing a third set of reference blocks of a third reference picture of the first reference picture list for the current picture; analyzing a fourth set of reference blocks of a fourth reference picture of the second reference picture list for the current picture; determining whether a third best-performing reference block of the third set of reference blocks performs better than a fourth best-performing reference block of the fourth set of reference blocks; and refining the second CPMV using either the third best-performing reference block or the fourth best-performing reference block according to whether the third best-performing reference block performs better than the fourth best-performing reference block.

Clause 46: The method of clause 36, wherein refining the second CPMV comprises, after refining the first CPMV, refining the second CPMV based on the first refined CPMV.

Clause 47: The method of clause 46, wherein refining the first CPMV and the second CPMV comprises: refining the first CPMV to minimize a first DMVR cost for the current block represented by an intermediate refined first CPMV and the second CPMV until a minimized first DMVR cost is yielded by the first refined CPMV; and refining the second CPMV to minimize a second DMVR cost for the current block represented by the first refined CPMV and an intermediate refined second CPMV until a minimized second DMVR cost is yielded by the second refined CPMV.

Clause 48: The method of clause 36, further comprising coding the first CPMV and the second CPMV using affine merge with motion vector difference (MMVD) mode.

Clause 49: The method of clause 48, wherein coding the first CPMV and the second CPMV using affine MMVD mode comprises: coding a first merge index for the first CPMV; coding a first motion vector difference (MVD) value for the first CPMV; coding a second merge index for the second CPMV; and coding a second MVD value for the second CPMV.

Clause 50: The method of clause 49, wherein coding the first MVD and the second MVD comprises: coding a first distance index representing a first motion magnitude for the first MVD; coding a first direction index representing a direction of the first MVD; coding a second distance index representing a second motion magnitude for the second MVD; and coding a second direction index representing a direction of the second MVD.

Clause 51: The method of clause 36, further comprising encoding the current block prior to decoding the current block.

Clause 52: A device for decoding video data, the device comprising: a memory configured to store video data; and a processing system comprising one or more processors implemented in circuitry, the processing system being configured to: refine a first control point motion vector (CPMV) of a current block of the video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block.

Clause 53: The device of clause 52, wherein to refine the first CPMV, the processing system is configured to: determine a first predicted CPMV according to a first merge index value; refine the first predicted CPMV using the first DMVR process to form a first intermediate refined CPMV; decode first motion vector difference (MVD) data; and add the first MVD data to the first intermediate refined CPMV to form the first refined CPMV; and wherein to refine the second CPMV, the processing system is configured to: determine a second predicted CPMV according to a second merge index value; refine the second predicted CPMV using the second DMVR process to form a second intermediate refined CPMV; decode second motion vector difference (MVD) data; and add the second MVD data to the second intermediate refined CPMV to form the second refined CPMV.

Clause 54: The device of clause 52, wherein the first DMVR process comprises a first bilateral matching process, and wherein the second DMVR process comprises a second, different bilateral matching process.

Clause 55: The device of clause 52, wherein the processing system is further configured to refine a third CPMV of the current block of video data using a third DMVR process, independently of the first DMVR process and the second DMVR process, to form a third refined CPMV for the current block, wherein to form the prediction block for the current block, the processing system is configured to form the prediction block using the first refined CPMV, the second refined CPMV, and the third refined CPMV.

Clause 56: The device of clause 55, wherein the first representative block includes the upper-left corner sample of the current block at a center of the first representative block, and wherein the second representative block includes the upper-right corner sample of the current block at a center of the second representative block.

Clause 57: The device of clause 55, wherein the first representative block is a first 4×4 sample block, and wherein the second representative block is a second 4×4 sample block.

Clause 58: The device of clause 52, wherein the first DMVR process generates a first CPMV offset, and wherein to refine the first CPMV, the processing system is configured to apply the first CPMV offset to the first CPMV, and wherein the second DMVR process generates a second CPMV offset, different from the first CPMV offset, and wherein to refine the second CPMV, the processing system is configured to apply the second CPMV offset to the second CPMV.

Clause 59: The device of clause 52, wherein the processing system is further configured to code data indicating that the first and second CPMVs are to be refined, the data forming part of at least one of a video parameter set (VPS), a sequence parameter set (SPS), a picture parameter set (PPS), a picture header, a slice header, or a block header.

Clause 60: The device of clause 52, wherein to perform the first DMVR process, the processing system is configured to: analyze a first set of reference blocks of a first reference picture of a first reference picture list for a current picture including the current block; analyze a second set of reference blocks of a second reference picture of a second reference picture list for the current picture; determine whether a first best-performing reference block of the first set of reference blocks performs better than a second best-performing reference block of the second set of reference blocks; and refine the first CPMV using either the first best-performing reference block or the second best-performing reference block according to whether the first best-performing reference block performs better than the second best-performing reference block, and wherein to perform the second DMVR process, the processing system is configured to: analyze a third set of reference blocks of a third reference picture of the first reference picture list for the current picture; analyze a fourth set of reference blocks of a fourth reference picture of the second reference picture list for the current picture; determine whether a third best-performing reference block of the third set of reference blocks performs better than a fourth best-performing reference block of the fourth set of reference blocks; and refine the second CPMV using either the third best-performing reference block or the fourth best-performing reference block according to whether the third best-performing reference block performs better than the fourth best-performing reference block.

Clause 61: The device of clause 52, wherein to refine the second CPMV, the processing system is configured to, after refining the first CPMV, refine the second CPMV based on the first refined CPMV.

Clause 62: The device of clause 61, wherein to refine the first CPMV and the second CPMV, the processing system is configured to: refine the first CPMV to minimize a first DMVR cost for the current block represented by an intermediate refined first CPMV and the second CPMV until a minimized first DMVR cost is yielded by the first refined CPMV; and refine the second CPMV to minimize a second DMVR cost for the current block represented by the first refined CPMV and an intermediate refined second CPMV until a minimized second DMVR cost is yielded by the second refined CPMV.

Clause 63: The device of clause 52, wherein the processing system is further configured to code the first CPMV and the second CPMV using affine merge with motion vector difference (MMVD) mode.

Clause 64: The device of clause 63, wherein to code the first CPMV, the processing system is configured to: code a first merge index for the first CPMV; and code a first motion vector difference (MVD) value for the first CPMV, and wherein to code the second CPMV, the processing system is configured to: code a second merge index for the second CPMV; and code a second MVD value for the second CPMV.

Clause 65: The device of clause 64, wherein to code the first MVD, the processing system is configured to: code a first distance index representing a first motion magnitude for the first MVD; and code a first direction index representing a direction of the first MVD, and wherein to code the second MVD, the processing system is configured to: code a second distance index representing a second motion magnitude for the second MVD; and code a second direction index representing a direction of the second MVD.

Clause 66: The device of clause 52, wherein the processing system is further configured to encode the current block prior to decoding the current block.

Clause 67: The device of clause 52, further comprising a display configured to display the decoded video data.

Clause 68: The device of clause 52, wherein the device comprises one or more of a camera, a computer, a mobile device, a broadcast receiver device, or a set-top box.

Clause 69: The device of clause 52, further comprising a memory configured to store the video data.

Clause 70: A computer-readable storage medium having stored thereon instructions that, when executed, cause a processor to: refine a first control point motion vector (CPMV) of a current block of video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block.

Clause 71: A device for decoding video data, the device comprising: means for refining a first control point motion vector (CPMV) of a current block of video data using a first decoder-side motion vector refinement (DMVR) process to form a first refined CPMV for the current block; means for refining a second CPMV of the current block of video data using a second DMVR process, independently of the first DMVR process, to form a second refined CPMV for the current block; means for forming a prediction block for the current block using the first refined CPMV and the second refined CPMV; and means for decoding the current block using the prediction block.

Clause 72: A method of decoding video data, the method comprising: refining a first control point motion vector (CPMV) of a current block of video data using a first decoder-side motion vector refinement (DMVR) process to form a first refined CPMV for the current block; refining a second CPMV of the current block of video data using a second DMVR process, independently of the first DMVR process, to form a second refined CPMV for the current block; forming a prediction block for the current block using the first refined CPMV and the second refined CPMV; and decoding the current block using the prediction block.

Clause 73: The method of clause 72, wherein refining the first CPMV comprises: determining a first predicted CPMV according to a first merge index value; refining the first predicted CPMV using the first DMVR process to form a first intermediate refined CPMV; decoding first motion vector difference (MVD) data; and adding the first MVD data to the first intermediate refined CPMV to form the first refined CPMV; and wherein refining the second CPMV comprises: determining a second predicted CPMV according to a second merge index value; refining the second predicted CPMV using the second DMVR process to form a second intermediate refined CPMV; decoding second motion vector difference (MVD) data; and adding the second MVD data to the second intermediate refined CPMV to form the second refined CPMV.

Clause 74: The method of any of clauses 72 and 73, wherein the first DMVR process comprises a first bilateral matching process, and wherein the second DMVR process comprises a second, different bilateral matching process.

Clause 75: The method of any of clauses 72-74, further comprising refining a third CPMV of the current block of video data using a third DMVR process, independently of the first DMVR process and the second DMVR process, to form a third refined CPMV for the current block, wherein forming the prediction block for the current block comprises forming the prediction block using the first refined CPMV, the second refined CPMV, and the third refined CPMV.

Clause 76: The method of any of clauses 72-75, wherein the first CPMV of the current block corresponds to an upper-left corner sample of the current block, and wherein the first DMVR process includes performing a search for a first representative block including the upper-left corner sample of the current block, and wherein the second CPMV of the current block corresponds to an upper-right corner sample of the current block, and wherein the second DMVR process includes performing a search for a second representative block including the upper-right corner sample of the current block.

Clause 77: The method of clause 76, wherein the first representative block includes the upper-left corner sample of the current block at a center of the first representative block, and wherein the second representative block includes the upper-right corner sample of the current block at a center of the second representative block.

Clause 78: The method of any of clauses 76 and 77, wherein the first representative block is a first 4×4 sample block, and wherein the second representative block is a second 4×4 sample block.

Clause 79: The method of any of clauses 72-78, wherein the first DMVR process generates a first CPMV offset, and wherein refining the first CPMV comprises applying the first CPMV offset to the first CPMV, and wherein the second DMVR process generates a second CPMV offset, different from the first CPMV offset, and wherein refining the second CPMV comprises applying the second CPMV offset to the second CPMV.

Clause 80: The method of any of clauses 72-79, further comprising coding data indicating that the first and second CPMVs are to be refined, the data forming part of at least one of a video parameter set (VPS), a sequence parameter set (SPS), a picture parameter set (PPS), a picture header, a slice header, or a block header.

Clause 81: The method of any of clauses 72-80, wherein the first DMVR process includes: analyzing a first set of reference blocks of a first reference picture of a first reference picture list for a current picture including the current block; analyzing a second set of reference blocks of a second reference picture of a second reference picture list for the current picture; determining whether a first best-performing reference block of the first set of reference blocks performs better than a second best-performing reference block of the second set of reference blocks; and refining the first CPMV using either the first best-performing reference block or the second best-performing reference block according to whether the first best-performing reference block performs better than the second best-performing reference block, and wherein the second DMVR process includes: analyzing a third set of reference blocks of a third reference picture of the first reference picture list for the current picture; analyzing a fourth set of reference blocks of a fourth reference picture of the second reference picture list for the current picture; determining whether a third best-performing reference block of the third set of reference blocks performs better than a fourth best-performing reference block of the fourth set of reference blocks; and refining the second CPMV using either the third best-performing reference block or the fourth best-performing reference block according to whether the third best-performing reference block performs better than the fourth best-performing reference block.

Clause 82: The method of any of clauses 72-81, wherein refining the second CPMV comprises, after refining the first CPMV, refining the second CPMV based on the first refined CPMV.

Clause 83: The method of clause 82, wherein refining the first CPMV and the second CPMV comprises: refining the first CPMV to minimize a first DMVR cost for the current block represented by an intermediate refined first CPMV and the second CPMV until a minimized first DMVR cost is yielded by the first refined CPMV; and refining the second CPMV to minimize a second DMVR cost for the current block represented by the first refined CPMV and an intermediate refined second CPMV until a minimized second DMVR cost is yielded by the second refined CPMV.

Clause 84: The method of any of clauses 72-83, further comprising coding the first CPMV and the second CPMV using affine merge with motion vector difference (MMVD) mode.

Clause 85: The method of clause 84, wherein coding the first CPMV and the second CPMV using affine MMVD mode comprises: coding a first merge index for the first CPMV; coding a first motion vector difference (MVD) value for the first CPMV; coding a second merge index for the second CPMV; and coding a second MVD value for the second CPMV.

Clause 86: The method of clause 85, wherein coding the first MVD and the second MVD comprises: coding a first distance index representing a first motion magnitude for the first MVD; coding a first direction index representing a direction of the first MVD; coding a second distance index representing a second motion magnitude for the second MVD; and coding a second direction index representing a direction of the second MVD.

Clause 87: The method of any of clauses 72-86, further comprising encoding the current block prior to decoding the current block.

Clause 88: A device for decoding video data, the device comprising: a memory configured to store video data; and a processing system comprising one or more processors implemented in circuitry, the processing system being configured to: refine a first control point motion vector (CPMV) of a current block of the video data using a first decoder-side motion vector refinement (DMVR) process to form a first refined CPMV for the current block; refine a second CPMV of the current block of video data using a second DMVR process, independently of the first DMVR process, to form a second refined CPMV for the current block; form a prediction block for the current block using the first refined CPMV and the second refined CPMV; and decode the current block using the prediction block.

Clause 89: The device of clause 88, wherein to refine the first CPMV, the processing system is configured to: determine a first predicted CPMV according to a first merge index value; refine the first predicted CPMV using the first DMVR process to form a first intermediate refined CPMV; decode first motion vector difference (MVD) data; and add the first MVD data to the first intermediate refined CPMV to form the first refined CPMV; and wherein to refine the second CPMV, the processing system is configured to: determine a second predicted CPMV according to a second merge index value; refine the second predicted CPMV using the second DMVR process to form a second intermediate refined CPMV; decode second motion vector difference (MVD) data; and add the second MVD data to the second intermediate refined CPMV to form the second refined CPMV.

Clause 90: The device of any of clauses 88 and 89, wherein the first DMVR process comprises a first bilateral matching process, and wherein the second DMVR process comprises a second, different bilateral matching process.

Clause 91: The device of any of clauses 88-90, wherein the processing system is further configured to refine a third CPMV of the current block of video data using a third DMVR process, independently of the first DMVR process and the second DMVR process, to form a third refined CPMV for the current block, wherein to form the prediction block for the current block, the processing system is configured to form the prediction block using the first refined CPMV, the second refined CPMV, and the third refined CPMV.

Clause 92: The device of clause 91, wherein the first representative block includes the upper-left corner sample of the current block at a center of the first representative block, and wherein the second representative block includes the upper-right corner sample of the current block at a center of the second representative block.

Clause 93: The device of any of clauses 91 and 92, wherein the first representative block is a first 4×4 sample block, and wherein the second representative block is a second 4×4 sample block.

Clause 94: The device of any of clauses 88-93, wherein the first DMVR process generates a first CPMV offset, and wherein to refine the first CPMV, the processing system is configured to apply the first CPMV offset to the first CPMV, and wherein the second DMVR process generates a second CPMV offset, different from the first CPMV offset, and wherein to refine the second CPMV, the processing system is configured to apply the second CPMV offset to the second CPMV.

Clause 95: The device of any of clauses 88-94, wherein the processing system is further configured to code data indicating that the first and second CPMVs are to be refined, the data forming part of at least one of a video parameter set (VPS), a sequence parameter set (SPS), a picture parameter set (PPS), a picture header, a slice header, or a block header.

Clause 96: The device of any of clauses 88-95, wherein to perform the first DMVR process, the processing system is configured to: analyze a first set of reference blocks of a first reference picture of a first reference picture list for a current picture including the current block; analyze a second set of reference blocks of a second reference picture of a second reference picture list for the current picture; determine whether a first best-performing reference block of the first set of reference blocks performs better than a second best-performing reference block of the second set of reference blocks; and refine the first CPMV using either the first best-performing reference block or the second best-performing reference block according to whether the first best-performing reference block performs better than the second best-performing reference block, and wherein to perform the second DMVR process, the processing system is configured to: analyze a third set of reference blocks of a third reference picture of the first reference picture list for the current picture; analyze a fourth set of reference blocks of a fourth reference picture of the second reference picture list for the current picture; determine whether a third best-performing reference block of the third set of reference blocks performs better than a fourth best-performing reference block of the fourth set of reference blocks; and refine the second CPMV using either the third best-performing reference block or the fourth best-performing reference block according to whether the third best-performing reference block performs better than the fourth best-performing reference block.

Clause 97: The device of any of clauses 88-96, wherein to refine the second CPMV, the processing system is configured to, after refining the first CPMV, refine the second CPMV based on the first refined CPMV.

Clause 98: The device of clause 97, wherein to refine the first CPMV and the second CPMV, the processing system is configured to: refine the first CPMV to minimize a first DMVR cost for the current block represented by an intermediate refined first CPMV and the second CPMV until a minimized first DMVR cost is yielded by the first refined CPMV; and refine the second CPMV to minimize a second DMVR cost for the current block represented by the first refined CPMV and an intermediate refined second CPMV until a minimized second DMVR cost is yielded by the second refined CPMV.

Clause 99: The device of any of clauses 88-98, wherein the processing system is further configured to code the first CPMV and the second CPMV using affine merge with motion vector difference (MMVD) mode.

Clause 100: The device of clause 99, wherein to code the first CPMV, the processing system is configured to: code a first merge index for the first CPMV; and code a first motion vector difference (MVD) value for the first CPMV, and wherein to code the second CPMV, the processing system is configured to: code a second merge index for the second CPMV; and code a second MVD value for the second CPMV.

Clause 101: The device of clause 100, wherein to code the first MVD, the processing system is configured to: code a first distance index representing a first motion magnitude for the first MVD; and code a first direction index representing a direction of the first MVD, and wherein to code the second MVD, the processing system is configured to: code a second distance index representing a second motion magnitude for the second MVD; and code a second direction index representing a direction of the second MVD.

Clause 102: The device of any of clauses 88-101, wherein the processing system is further configured to encode the current block prior to decoding the current block.

Clause 103: The device of any of clauses 88-102, further comprising a display configured to display the decoded video data.

Clause 104: The device of any of clauses 88-103, wherein the device comprises one or more of a camera, a computer, a mobile device, a broadcast receiver device, or a set-top box.

Clause 105: The device of any of clauses 88-104, further comprising a memory configured to store the video data.

Clause 106: A computer-readable storage medium having stored thereon instructions that, when executed, cause a processor to perform the method of any of clauses 72-87.

Clause 107: A device for decoding video data, the device comprising means for performing the method of any of clauses 72-87.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

performing a first decoder-side motion vector refinement (DMVR) process to refine a first control point motion vector (CPMV) of a current block of video data to form a first refined CPMV for the current block;

performing, independent of the performance of the first DMVR process, a second DMVR process to refine a second CPMV of the current block of video data to form a second refined CPMV for the current block, the second DMVR process being distinct from the first DMVR process;

forming a prediction block for the current block using the first refined CPMV and the second refined CPMV according to affine prediction mode; and decoding the current block using the prediction block.

2. The method of claim 1, wherein refining the first CPMV comprises:

determining a first predicted CPMV according to a first merge index value;

refining the first predicted CPMV using the first DMVR process to form a first intermediate refined CPMV;

decoding first motion vector difference (MVD) data; and adding the first MVD data to the first intermediate refined CPMV to form the first refined CPMV; and wherein refining the second CPMV comprises:

determining a second predicted CPMV according to a second merge index value;

refining the second predicted CPMV using the second DMVR process to form a second intermediate refined CPMV;

decoding second motion vector difference (MVD) data; and adding the second MVD data to the second intermediate refined CPMV to form the second refined CPMV.

3. The method of claim 1, wherein the first DMVR process comprises a first bilateral matching process, and wherein the second DMVR process comprises a second, different bilateral matching process.

4. The method of claim 1, further comprising performing, independent of the performance of the first DMVR process and independent of the performance of the second DMVR process, a third DMVR process to refine a third CPMV of the current block of video data to form a third refined CPMV for the current block, wherein forming the prediction block for the current block comprises forming the prediction block using the first refined CPMV, the second refined CPMV, and the third refined CPMV.

5. The method of claim 4, further comprising:

performing the second DMVR process in parallel with the performance of the first DMVR process; and performing the third DMVR process in parallel with the performance of the first DMVR process.

6. The method of claim 1, wherein the first CPMV of the current block corresponds to an upper-left corner sample of the current block, and wherein the first DMVR process includes performing a search for a first representative block including the upper-left corner sample of the current block, and wherein the second CPMV of the current block corresponds to an upper-right corner sample of the current block, and wherein the second DMVR process includes performing a search for a second representative block including the upper-right corner sample of the current block.

7. The method of claim 6, wherein the first representative block includes the upper-left corner sample of the current block at a center of the first representative block, and wherein the second representative block includes the upper-right corner sample of the current block at a center of the second representative block.

8. The method of claim 6, wherein the first representative block is a first 4×4 sample block, and wherein the second representative block is a second 4×4 sample block.

9. The method of claim 1, wherein the first DMVR process generates a first CPMV offset, and wherein refining the first CPMV comprises applying the first CPMV offset to the first CPMV, and wherein the second DMVR process generates a second CPMV offset, different from the first CPMV offset, and wherein refining the second CPMV comprises applying the second CPMV offset to the second CPMV.

10. The method of claim 1, further comprising coding data indicating that the first and second CPMVs are to be refined, the data forming part of at least one of a video parameter set (VPS), a sequence parameter set (SPS), a picture parameter set (PPS), a picture header, a slice header, or a block header.

11. The method of claim 1, wherein the first DMVR process includes:

analyzing a first set of reference blocks of a first reference picture of a first reference picture list for a current picture including the current block;

analyzing a second set of reference blocks of a second reference picture of a second reference picture list for the current picture;

determining whether a first best-performing reference block of the first set of reference blocks performs better than a second best-performing reference block of the second set of reference blocks; and refining the first CPMV using either the first best-performing reference block or the second best-performing reference block according to whether the first best-performing reference block performs better than the second best-performing reference block, and wherein the second DMVR process includes:

analyzing a third set of reference blocks of a third reference picture of the first reference picture list for the current picture;

analyzing a fourth set of reference blocks of a fourth reference picture of the second reference picture list for the current picture;

determining whether a third best-performing reference block of the third set of reference blocks performs better than a fourth best-performing reference block of the fourth set of reference blocks; and refining the second CPMV using either the third best-performing reference block or the fourth best-performing reference block according to whether the third best-performing reference block performs better than the fourth best-performing reference block.

12. The method of claim 1, wherein performing the second DMVR process to refine the second CPMV comprises, after performing the first DMVR process to refine the first CPMV at a first time, performing the second DMVR process to refine the second CPMV at a second time different than the first time.

13. The method of claim 12, further comprising:

refining the first CPMV to minimize a first DMVR cost for the current block represented by an intermediate refined first CPMV and the second CPMV until a minimized first DMVR cost is yielded by the first refined CPMV; and refining the second CPMV to minimize a second DMVR cost for the current block represented by the first refined CPMV and an intermediate refined second CPMV until a minimized second DMVR cost is yielded by the second refined CPMV.

14. The method of claim 1, further comprising coding the first CPMV and the second CPMV using affine merge with motion vector difference (MMVD) mode.

15. The method of claim 14, wherein coding the first CPMV and the second CPMV using affine MMVD mode comprises:

coding a first merge index for the first CPMV;

coding a first motion vector difference (MVD) value for the first CPMV;

coding a second merge index for the second CPMV; and coding a second MVD value for the second CPMV.

16. The method of claim 15, wherein coding the first MVD and the second MVD comprises:

coding a first distance index representing a first motion magnitude for the first MVD;

coding a first direction index representing a direction of the first MVD;

coding a second distance index representing a second motion magnitude for the second MVD; and coding a second direction index representing a direction of the second MVD.

17. The method of claim 1, further comprising encoding the current block prior to decoding the current block.

18. The method of claim 1, further comprising performing the second DMVR process in parallel with the performance of the first DMVR process.

19. A device for decoding video data, the device comprising:

a memory configured to store video data; and a processing system comprising one or more processors implemented in circuitry, the processing system being configured to:

perform a first decoder-side motion vector refinement (DMVR) process to refine a first control point motion vector (CPMV) of a current block of the video data to form a first refined CPMV for the current block;

perform, independent of the performance of the first DMVR process, a second DMVR process to refine a second CPMV of the current block of video data to form a second refined CPMV for the current block, the second DMVR process being distinct from the first DMVR process;

form a prediction block for the current block using the first refined CPMV and the second refined CPMV according to affine prediction mode; and decode the current block using the prediction block.

20. The device of claim 19, wherein to refine the first CPMV, the processing system is configured to:

determine a first predicted CPMV according to a first merge index value;

refine the first predicted CPMV using the first DMVR process to form a first intermediate refined CPMV;

decode first motion vector difference (MVD) data; and add the first MVD data to the first intermediate refined CPMV to form the first refined CPMV; and wherein to refine the second CPMV, the processing system is configured to:

determine a second predicted CPMV according to a second merge index value;

refine the second predicted CPMV using the second DMVR process to form a second intermediate refined CPMV;

decode second motion vector difference (MVD) data; and add the second MVD data to the second intermediate refined CPMV to form the second refined CPMV.

21. The device of claim 19, wherein the first DMVR process comprises a first bilateral matching process, and wherein the second DMVR process comprises a second, different bilateral matching process.

22. The device of claim 19, wherein the processing system is further configured to perform, independent of the performance of the first DMVR process and independent of the performance of the second DMVR process, a third DMVR process to refine a third CPMV of the current block of video data to form a third refined CPMV for the current block, wherein to form the prediction block for the current block, the processing system is configured to form the prediction block using the first refined CPMV, the second refined CPMV, and the third refined CPMV.

23. The device of claim 22, wherein the processing system is further configured to:

perform the second DMVR process in parallel with the performance of the first DMVR process; and perform the third DMVR process in parallel with the performance of the first DMVR process.

24. The device of claim 19, wherein the first DMVR process generates a first CPMV offset, and wherein to refine the first CPMV, the processing system is configured to apply the first CPMV offset to the first CPMV, and wherein the second DMVR process generates a second CPMV offset, different from the first CPMV offset, and wherein to refine the second CPMV, the processing system is configured to apply the second CPMV offset to the second CPMV.

25. The device of claim 19, wherein the processing system is further configured to code data indicating that the first and second CPMVs are to be refined, the data forming part of at least one of a video parameter set (VPS), a sequence parameter set (SPS), a picture parameter set (PPS), a picture header, a slice header, or a block header.

26. The device of claim 19, wherein to perform the first DMVR process, the processing system is configured to:

analyze a first set of reference blocks of a first reference picture of a first reference picture list for a current picture including the current block;

analyze a second set of reference blocks of a second reference picture of a second reference picture list for the current picture;

determine whether a first best-performing reference block of the first set of reference blocks performs better than a second best-performing reference block of the second set of reference blocks; and refine the first CPMV using either the first best-performing reference block or the second best-performing reference block according to whether the first best-performing reference block performs better than the second best-performing reference block, and wherein to perform the second DMVR process, the processing system is configured to:

analyze a third set of reference blocks of a third reference picture of the first reference picture list for the current picture;

analyze a fourth set of reference blocks of a fourth reference picture of the second reference picture list for the current picture;

determine whether a third best-performing reference block of the third set of reference blocks performs better than a fourth best-performing reference block of the fourth set of reference blocks; and refine the second CPMV using either the third best-performing reference block or the fourth best-performing reference block according to whether the third best-performing reference block performs better than the fourth best-performing reference block.

27. The device of claim 19, wherein to perform the second DMVR process to refine the second CPMV, the processing system is configured to, after the performance of the first DMVR process to refine the first CPMV at a first time, perform the second DMVR process to refine the second CPMV at a second time different than the first time.

28. The device of claim 27, wherein the processing system is configured to:

refine the first CPMV to minimize a first DMVR cost for the current block represented by an intermediate refined first CPMV and the second CPMV until a minimized first DMVR cost is yielded by the first refined CPMV; and refine the second CPMV to minimize a second DMVR cost for the current block represented by the first refined CPMV and an intermediate refined second CPMV until a minimized second DMVR cost is yielded by the second refined CPMV.

29. The device of claim 19, wherein the processing system is further configured to code the first CPMV and the second CPMV using affine merge with motion vector difference (MMVD) mode.

30. The device of claim 29, wherein to code the first CPMV, the processing system is configured to:

code a first merge index for the first CPMV; and code a first motion vector difference (MVD) value for the first CPMV, and wherein to code the second CPMV, the processing system is configured to:

code a second merge index for the second CPMV; and code a second MVD value for the second CPMV.

31. The device of claim 30, wherein to code the first MVD, the processing system is configured to:

code a first distance index representing a first motion magnitude for the first MVD; and code a first direction index representing a direction of the first MVD, and wherein to code the second MVD, the processing system is configured to:

code a second distance index representing a second motion magnitude for the second MVD; and code a second direction index representing a direction of the second MVD.

32. The device of claim 19, wherein the processing system is further configured to encode the current block prior to decoding the current block.

33. The device of claim 19, further comprising a display configured to display the decoded video data.

34. The device of claim 19, wherein the device comprises one or more of a camera, a computer, a mobile device, a broadcast receiver device, or a set-top box.

35. The device of claim 19, further comprising a memory configured to store the video data.

36. The device of claim 19, wherein the processing system is further configured to perform the second DMVR process in parallel with the performance of the first DMVR process.

37. A non-transitory, computer-readable storage medium having stored thereon instructions that, when executed, cause a processor to:

perform a first decoder-side motion vector refinement (DMVR) process to refine a first control point motion vector (CPMV) of a current block of video data to form a first refined CPMV for the current block;

perform, independent of the performance of the first DMVR process, a second DMVR process to refine a second CPMV of the current block of video data to form a second refined CPMV for the current block, the second DMVR process being distinct from the first DMVR process;

form a prediction block for the current block using the first refined CPMV and the second refined CPMV according to affine prediction mode; and decode the current block using the prediction block.

38. The non-transitory, computer-readable storage medium of claim 33, wherein the instructions further cause the processor to perform the second DMVR process in parallel with the performance of the first DMVR process.

39. The non-transitory, computer-readable storage medium of claim 33, wherein the instructions further cause the processor to perform, independent of the performance of the first DMVR process and independent of the performance of the second DMVR process, a third DMVR process to refine a third CPMV of the current block of video data to form a third refined CPMV for the current block, wherein to form the prediction block for the current block, the instructions further cause the processor to form the prediction block using the first refined CPMV, the second refined CPMV, and the third refined CPMV.

40. The non-transitory, computer-readable storage medium of claim 39, wherein the instructions further cause the processor to:

perform the second DMVR process in parallel with the performance of the first DMVR process; and perform the third DMVR process in parallel with the performance of the first DMVR process.

* * * * *